(12) United States Patent
Martin et al.

(10) Patent No.: US 10,117,180 B2
(45) Date of Patent: Oct. 30, 2018

(54) COMMUNICATIONS DEVICE AND METHOD

(71) Applicant: Sony Corporation, Tokyo (JP)

(72) Inventors: Brian Alexander Martin, Basingstoke (GB); Hideji Wakabayashi, Basingstoke (GB); Jussi Kahtava, Basingstoke (GB); Yuichi Morioka, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 80 days.

(21) Appl. No.: 14/915,999

(22) PCT Filed: Sep. 10, 2014

(86) PCT No.: PCT/EP2014/069308
§ 371 (c)(1),
(2) Date: Mar. 2, 2016

(87) PCT Pub. No.: WO2015/043958
PCT Pub. Date: Apr. 2, 2015

(65) Prior Publication Data
US 2016/0302153 A1    Oct. 13, 2016

(30) Foreign Application Priority Data
Sep. 27, 2013   (EP) .................................... 13186547

(51) Int. Cl.
*H04B 7/00* (2006.01)
*H04W 52/02* (2009.01)
(Continued)

(52) U.S. Cl.
CPC ......... *H04W 52/0222* (2013.01); *H04J 11/00* (2013.01); *H04L 69/28* (2013.01);
(Continued)

(58) Field of Classification Search
CPC ........... H04W 52/0222; H04W 64/003; H04W 76/046; H04W 72/048; H04W 68/02;
(Continued)

(56) References Cited

U.S. PATENT DOCUMENTS 9,564,958 B2 * 2/2017 Martinez Tarradell .....................
H04W 76/14
2012/0281566 A1 * 11/2012 Pelletier .............. H04W 76/046
370/252
(Continued)

FOREIGN PATENT DOCUMENTS

WO    WO 2014/174242 A1    10/2014

OTHER PUBLICATIONS

International Search Report dated Nov. 17, 2014 in PCT/EP2014/069308.

(Continued)

*Primary Examiner* — Chuong T Ho
(74) *Attorney, Agent, or Firm* — Xsensus, LLP

(57) ABSTRACT

A communications device establishes a communications context for communicating data packets using a packet communications bearer from the communications device via mobile communications network in a connected state and releases communications context when in an idle state. A controller is configured in combination with a receiver to receive signalling information providing an indication of one or more functions performed by at least one of the receiver, a transmitter, or the controller which can be changed in a power saving state, and when in either the idle state or the connected state, to enter the power saving state in which the one or more of the operations performed by at least one of the receiver, the transmitter, or the controller are changed in accordance with the indication of the changed
(Continued)

functions received in the signalling information from the mobile communications network.

23 Claims, 17 Drawing Sheets

(51) Int. Cl.
| | | |
|---|---|---|
| *H04J 11/00* | (2006.01) | |
| *H04L 29/06* | (2006.01) | |
| *H04W 40/00* | (2009.01) | |
| *H04W 64/00* | (2009.01) | |
| *H04W 68/02* | (2009.01) | |
| *H04W 72/04* | (2009.01) | |
| *H04W 4/70* | (2018.01) | |
| *H04W 76/27* | (2018.01) | |
| *H04W 76/28* | (2018.01) | |
| *H04W 36/30* | (2009.01) | |
| *H04W 88/12* | (2009.01) | |
| *H04W 88/16* | (2009.01) | |

(52) U.S. Cl.
CPC ............ *H04W 4/70* (2018.02); *H04W 40/005* (2013.01); *H04W 52/0212* (2013.01); *H04W 64/003* (2013.01); *H04W 68/02* (2013.01); *H04W 72/048* (2013.01); *H04W 76/27* (2018.02); *H04W 76/28* (2018.02); *H04Q 2209/60* (2013.01); *H04W 36/30* (2013.01); *H04W 88/12* (2013.01); *H04W 88/16* (2013.01); *Y02D 70/00* (2018.01); *Y02D 70/1242* (2018.01); *Y02D 70/1262* (2018.01); *Y02D 70/21* (2018.01); *Y02D 70/24* (2018.01); *Y02D 70/25* (2018.01)

(58) Field of Classification Search
CPC . H04W 4/005; H04W 40/005; H04W 76/048; H04W 52/0212; H04W 88/16; H04W 88/12; H04J 11/00; H04L 69/28; H04Q 2209/60
USPC .................................................. 370/311, 312
See application file for complete search history.

(56) References Cited

U.S. PATENT DOCUMENTS

| | | | |
|---|---|---|---|
| 2013/0028097 A1* | 1/2013 | Barrett .................. H04W 4/20 370/241 |
| 2013/0039287 A1 | 2/2013 | Rayavarapu et al. | |
| 2013/0265922 A1* | 10/2013 | Chakravarthy ... H04W 52/0212 370/311 |
| 2013/0343256 A1* | 12/2013 | Zakrzewski ............ H04W 8/26 370/312 |
| 2015/0043403 A1* | 2/2015 | Martinez Tarradell ..................... H04W 76/14 370/311 |
| 2017/0245213 A1* | 8/2017 | Martinez Tarradell ..................... H04W 76/14 |

OTHER PUBLICATIONS

"3rd Generation Partnership Project; Technical Specification Group Services and System Aspects; Machine-Type and other mobile data applications Communications enhancements (Release 12)" 3GPP, 3GPP TR 23.887, V1.2.0, XP050712200, Aug. 2013, 154 Pages.

"3rd Generation Partnership Project; Technical Specification Group Radio Access Network; Study on Enhancements to Machine-Type Communications (MTC) and other Mobile Data Applications; Radio Access Network (RAN) aspects (Release 12)" 3GPP, 3GPP TR 37.869, V0.2.0, Apr. 2013, 13 Pages.

\* cited by examiner

State Transitions: RRC_IDLE/ECM_IDLE->
RRC_CONNECTED/ECM_DLE-> RRC_CONNECTED/ECM_CONNECTED->
RRC_IDLE/ECM_IDLE Control-plane protocol stack User-plane protocol stack State transition diagram showing transition between
RRC_CONNECTED + ECM_CONNECTED and RRC_NewState + ECM_CONNECTED Details of State Transitions Between RRC_CONNECTED and RRC_NewState Signalling Flows related to transition between RRC_CONNECTED and RRC_NewState Power saving state in the UE from Idle state State Configuration A State Configuration B State Configuration C Pre-defined sub-state behaviours

COMMUNICATIONS DEVICE AND METHOD

CROSS-REFERENCE TO RELATED APPLICATIONS

The present application is based on PCT filing PCT/EP2014/069308 filed Sep. 10, 2014, and claims priority to European Patent Application 13 186 547.9, filed in the European Patent Office on 27 Sep. 2013, the entire contents of each of which being incorporated herein by reference.

TECHNICAL FIELD OF THE DISCLOSURE

The present disclosure relates to communications devices, and methods of communicating using communications devices, infrastructure equipment for mobile communications networks, mobile communications networks and systems and methods of communicating using mobile communications networks.

BACKGROUND OF THE DISCLOSURE

Mobile communications systems continue to be developed to provide wireless communications services to a greater variety of electronic devices. In more recent years, third and fourth generation mobile telecommunication systems, such as those based on the 3GPP defined UMTS and Long Term Evolution (LTE) architectures have been developed to support more sophisticated communications services to personal computing and communications devices than simple voice and messaging services offered by previous generations of mobile telecommunication systems. For example, with the improved radio interface and enhanced data rates provided by LTE systems, a user may enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

More recently it has been recognised that rather than providing high data rate communications services to certain types of electronics devices, it is also desirable to provide communications services to electronics devices that are simpler and less sophisticated. For example, so-called machine type communication (MTC) applications may be semi-autonomous or autonomous wireless communication devices which may communicate small amounts of data on a relatively infrequent basis. Some examples include so-called smart meters which, for example, are located in a customer's house and periodically transmit information back to a central MTC server data relating to the customer's consumption of a utility such as gas, water, electricity and so on.

Whilst it can be convenient for a communications device such as an MTC type device to take advantage of the wide coverage area provided by a third or fourth generation mobile telecommunication network there are at present disadvantages. Unlike a conventional third or fourth generation communications device such as a smartphone, a lower complexity device may operate with a lower bandwidth and be preferably relatively simple and inexpensive. The type of functions performed by the MTC-type device (e.g. collecting and reporting back data) do not require particularly complex processing to perform.

As will be appreciated, there may be a desire for many types of communications devices and mobile communications networks to use communications resources as efficiently as possible and to reduce power consumption. It is known for example to reduce the power consumed by a communications device by performing what is known as discontinuous reception. Discontinuous reception is a technique in which a communications device may be radio resource connected, but after monitoring a control channel to determine whether communications resources have been allocated to the communications device, the communications device can sleep for a remainder of a time before another transmission may occur on control channel. Accordingly the communications device can save power.

SUMMARY OF THE DISCLOSURE

Embodiments of the present disclosure can provide in one example a communication device for transmitting data to and receiving data from a mobile communications network. The mobile communications network includes one or more network elements providing a wireless access interface for communicating with the communications device. The communications device comprising a transmitter unit configured to transmit signals to the mobile communications network via the wireless access interface provided by the one or more network elements of the mobile communications network, and a receiver unit configured to receive signals from the mobile communications network via the wireless access interface, and a controller. The controller is configured to control the receiver unit to receive one or more signalling messages from the mobile communications network, and the transmitter unit to transmit one or more signalling messages to the communications network, so as to establish a communications context for communicating data packets using a packet communications bearer from the communications device via the mobile communications network when operating in a connected state, and to release the communications context and the packet communications bearer, to an idle state. The controller is configured in combination with the receiver to receive signalling information providing an indication of one or more functions performed by at least one of the receiver, the transmitter or the controller which can be changed in a power saving state to reduce power consumed by the communications device, and when in either the idle state or the connected state, to enter the power saving state in which the one or more of the operations performed by at least one of the receiver, the transmitter or the controller are configured in accordance with the indication of the changed functions received in the signalling information from the mobile communications network.

In some embodiments the power saving state may be one of a plurality of power saving states and the controller may be configured to receive the signalling information from the mobile communications network, which provides an indication of one of the plurality of power saving states, each of the power saving states providing a different set of one or more operations performed by at least one of the receiver, the transmitter or the controller which can be configured. The controller may be configured to enter one of the reduced power saving states in accordance with predetermined conditions, in which the one or more of the operations performed by at least one of the receiver, the transmitter or the controller are configured in accordance with the indication of the changed functions for that power saving state.

In one example the mobile communications network also transmits second signalling information providing an indication of predetermined conditions for entering a power saving state from either the idle state or the connected state. Accordingly the mobile communications network can control the operations of a communications device so that it can be arranged to enter a power saving state, for each communications device and for each connection. As such a communications device can be configured to enter a power saving state in accordance with its capabilities and its function. In some examples the predetermined conditions include whether or not the communications device can enter the power saving state from the idle state or the connected state.

Further aspects and features of the present disclosure are defined in the appended claims, including but not limited to, a mobile communications device, a method of communicating, a network infrastructure element, a communications network and the method of communicating via a wireless access interface.

BRIEF DESCRIPTION OF DRAWINGS

Embodiments of the present disclosure will now be described by way of example only with reference to the accompanying drawings in which like parts are provided with corresponding reference numerals and in which.

DESCRIPTION OF EXAMPLE EMBODIMENTS

The example embodiments will be generally described in the context of a 3GPP LTE architecture. However, the invention is not limited to an implementation in a 3GPP LTE architecture. Conversely, any suitable mobile architecture is considered to be relevant.

Conventional Network

Figure 1:
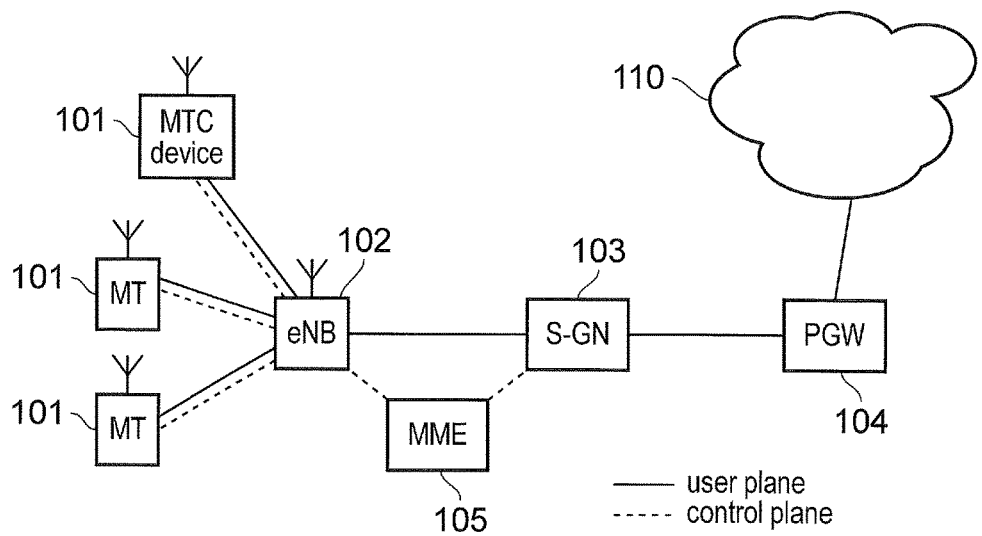
FIG. 1 provides a schematic diagram illustrating an example of a mobile communications network configured in accordance with LTE.

FIG. 1 provides a schematic diagram illustrating the basic functionality of a conventional mobile telecommunications network. The network includes one or more base stations 102 (one base station represented) connected to a serving gateway (S-GW) 103 for traffic in the user plane and to a Mobility Management Entity (MME) for signalling in the control plane. In LTE, the base stations are called e-NodeB, which are referred to in the following description as eNB. Each base station provides a coverage area 103 within which data can be communicated to and from communications devices 101. Data is transmitted from a base station 102 to a communications device 101 within a coverage area via a radio downlink. Data is transmitted from a communications device 101 to a base station 102 via a radio uplink. The core network, comprising the MME 105, the S-GW 103 and the PDN-Gateway (P-GW) 104, routes data to and from the communications devices 101 and provides functions such as authentication, mobility management, charging and so on. The P-GW is connected to one or more other networks, which may for example include the internet, an IMS core network, etc. In the illustration of FIG. 1, connections on the user plane have been represented with a plain line while connections on the control plane have been represented with a dashed line.

The term communications devices will be used to refer to a communications terminal or apparatus which can transmit or receive data via the mobile communications system. Other terms may also be used for communications devices such as personal computing apparatus, remote terminal, transceiver device or user equipment (UE) which may or may not be mobile.

Figure 2:
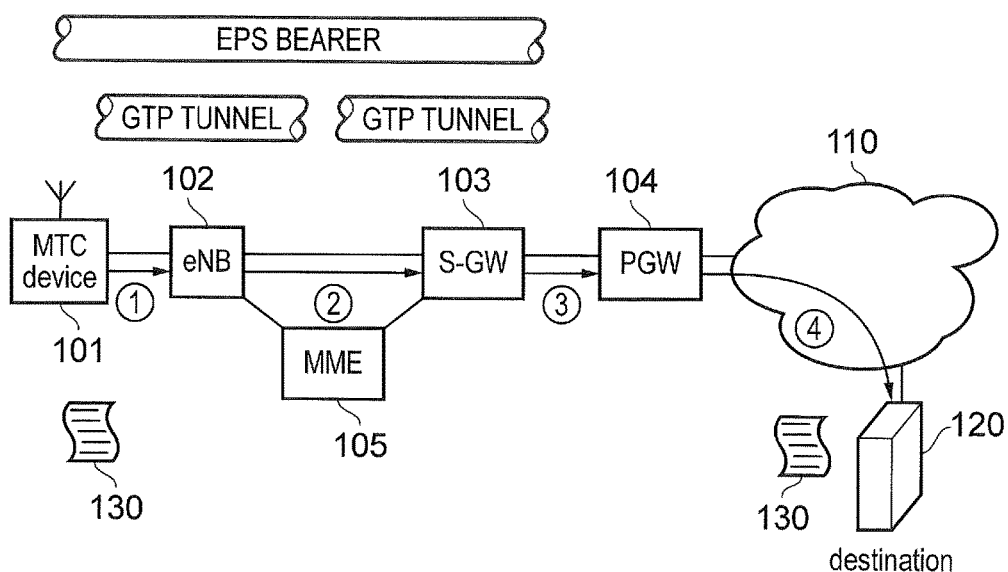
FIG. 2 provides a schematic diagram illustrating an arrangement of an Enhanced Packet Service bearer established for communicating data packets via the mobile communications network.

FIG. 2 illustrates an example of a path followed by a message 130 communicated by a communications device 101. In that example an MTC communications device 101, wishes to send the message 130 to a destination 120, the destination being reachable via the internet. In this example, a destination device is represented as a computer. However the destination 120 could be an element of any suitable type where the element can be addressed by the communications device 101. For example, the destination device 120 may be another communications device, a personal computer, a server, a proxy, or an intermediary element (to a final destination).

The following description provides a summary explanation of an example of operation in which a communications device communicates the message 130 via an LTE network, which is helpful in appreciating some aspects and advantages of the present technique.

In order for the communications device 101 to send data to a destination, an EPS bearer between the communications device 101 and the PGW 104 is set up, the EPS bearer being partially carried over a GTP tunnel between the eNB 102 and the SGW and another GTP tunnel between SGW and PGW 104, as illustrated in FIG. 2. As the message 130 is carried to the destination device, it is sent from the communications device 101, at a first end of an EPS bearer to the eNB 102 (step 1), then to the S-GW 103 (step 2) and then to the P-GW 104 (step 3), at the other end of the EPS bearer. The P-GW 104 then forwards the message 130 to the destination 120 (step 4).

Figure 3:
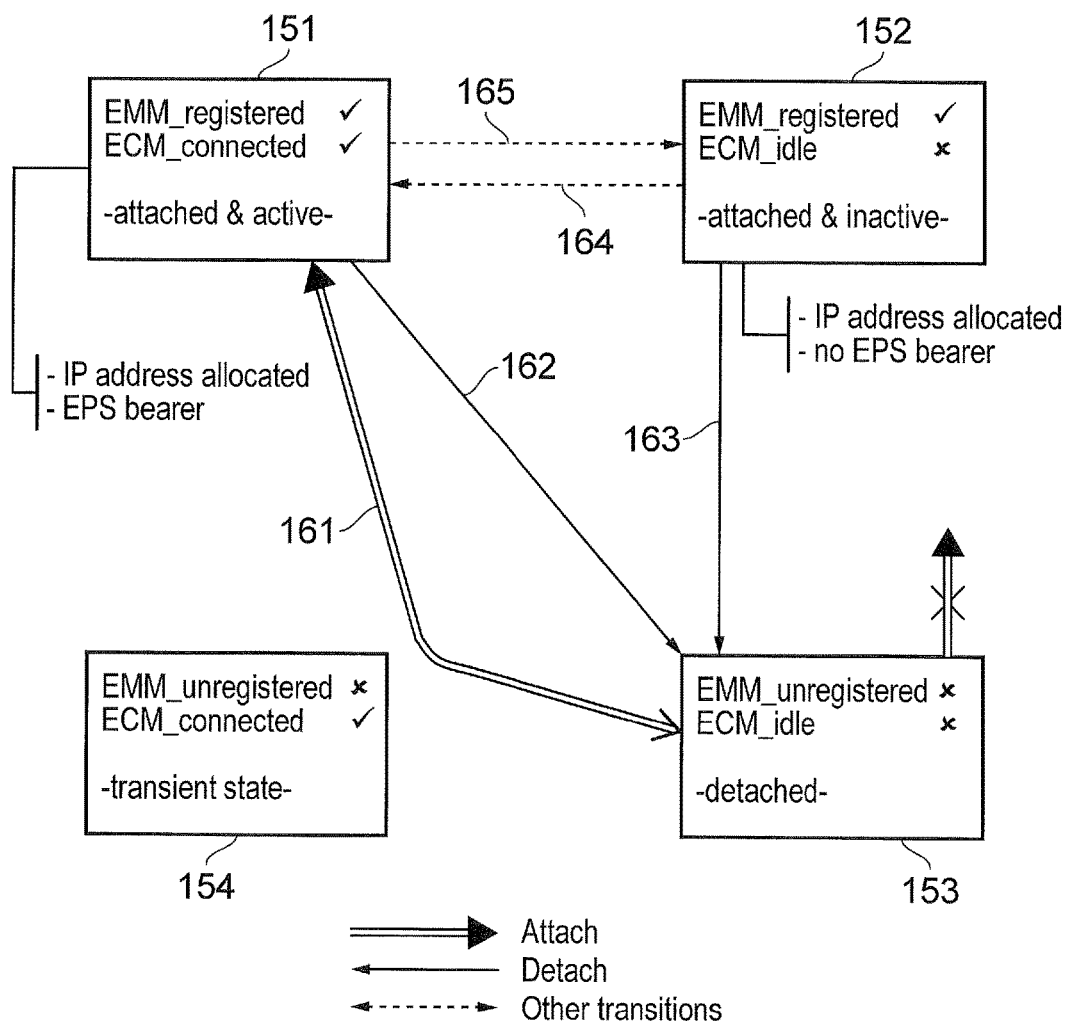
FIG. 3 provides a schematic diagram representing the states of the communications device including whether the device is EMM registered or ECM connected.

FIG. 3 illustrates the various transitions between the four possible combinations of ECM states (connected or idle) and EMM states (registered or unregistered) as defined in the LTE standards for a communications device with a view to illustrating how communications devices' connections are managed. The acronym ECM stands for "EPS Connection Management" and the ECM state generally indicates whether the communications device has a Non-Access Stratum (NAS) connection set up with the MME. In LTE, as the communications device connects to the MME and switches to ECM_connected, it also sets up an EPS bearer, that is, a data connection to the P-GW via the S-GW. Also, as the communications device switches from ECM_connected to ECM_idle, the EPS bearer is torn down, and all S1 and RRC connections are released. The acronym EMM stands for "EPS Mobility Management" and the EMM state generally indicates whether a communications device is attached to the network. When the communications device is in EMM_unregistered, it may for example be turned off, out of coverage or connected to a different network. In contrast, when a communications device is in EMM_registered, it is attached to the network and, as such, it has an IP address and a NAS security context in the MME. It may or may not have an EPS bearer set up, but in any case, it has some context associated with it in the MME (e.g. NAS security context) and in the P-GW (e.g. the IP address). In addition the MME will know in which tracking areas the UE is located. The four ECM/EMM states and the transitions between them is described next.

The communications device 101 is assumed to start from a state 153 in which the communications device 101 is not connected to the network. In the state 153, the communications device is in EMM_unregistered and ECM_idle states. From this state, the communications device can attach to the network to be in EMM_registered and ECM_connected states. However, in order to attach, the communications device cannot switch to EMM_registered if it has not switched to ECM_connected first. In other words, starting from state 153, the communications device cannot go to states 152 or 151 and it has to go to state 154 first. Therefore, as illustrated by arrow 161, a communications device in state 153 can attach to the network by first switching to ECM connected and then to EMM_registered. As a communications device starts an attachment procedure from state 153, the communications device moves from a state 153 where it does not have any connection to a state 151 where it has a NAS connection to the MME, an IP address allocated by the P-GW, and a EPS bearer to the P-GW via the e-NB and the S-GW.

Transitions between states 151 and 152 occur when a data connection (EPS bearer) is set up (164) or when all data connections have been released (165). Generally, transition 165 occurs when the user had an EPS bearer active and has not been using the bearer for a certain time. The network can then decide that the communications device no longer needs an EPS bearer and thus release all the corresponding resources and switch the communications device to ECM_idle. Transition 164 generally occurs when the communications device has not been using any EPS bearer (see for example the discussion on transition 164) and now has data to send or receive. An EPS bearer is then set up for this communications device and it is switched to ECM_connected. Whenever the communications device is EMM_registered, regardless of the ECM states, the communications device will have an IP address that can be used to reach the communications device, in other words an IP context remains active even if no actual EPS bearer is currently active (e.g. state 152).

If the communications device detaches from the network, for example because it is turned off, moving to a different network, or for any other reason, it will switch from any state it is into state 153, releasing any outstanding EPS bearer or context that was previously maintained for the communications device, via transitions 162 or 163.

As can be understood, the state 154 where the communications device is in ECM_connected and in EMM_unregistered is a transient state and the communications device does not generally remain in that particular state. A communications device in that state is either a communications device switching from state 153 (detached and inactive) to state 151 (attached and active) or a communications device switching from state 151 to state 153.

RRC states are also provided to reflect the status of the RRC connection between the communications device and the eNB (RRC_connected and RRC_idle). Under conventional operation conditions, the RRC states correspond to the ECM states: if the communications device is in ECM_connected, it should also be in RRC_connected and if it is in ECM_idle, it should also be in RRC_idle. Discrepancies between ECM and RRC states may occur for a short period of time as a connection is being set-up or torn-down. An illustration of the states of a communications device 101 which include both the ECM states and the RRC states is illustrated in FIG. 4.

Figure 4:
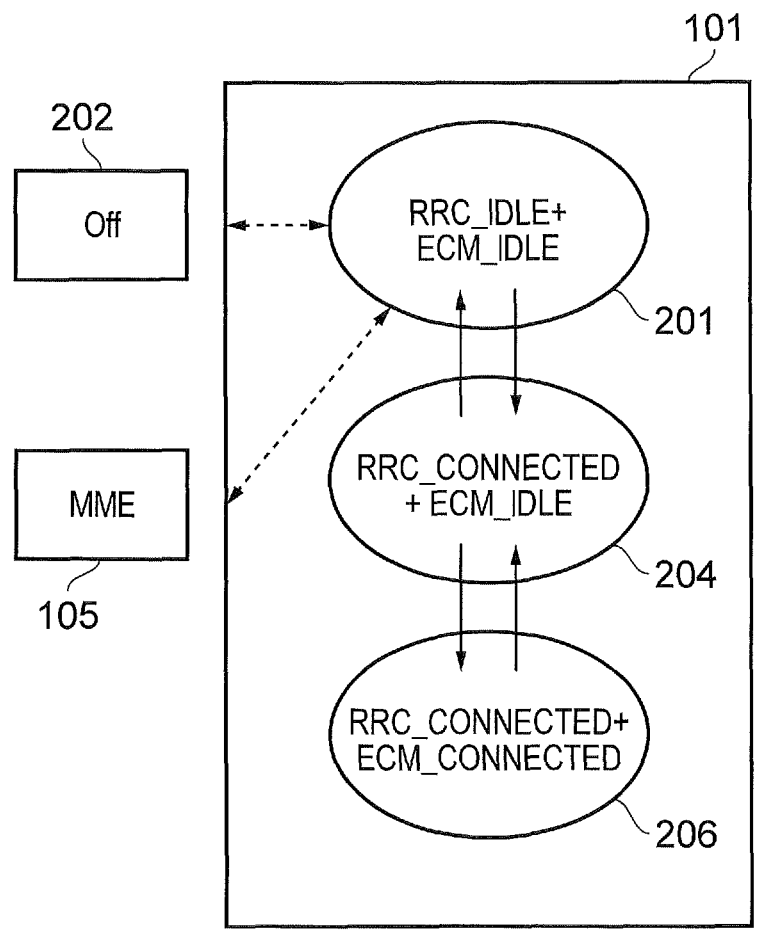
FIG. 4 is a schematic illustration of state transitions of a communications device operating in the mobile communications network of FIG. 1.

As shown in FIG. 4 a communications device 101 may start in the RRC Idle/ECM Idle state when the device is off and not being used by the user. The off state is therefore represented by a box 201. As soon as the communications device 101 is activated it must connect to the MME 105 in order to perform a tracking area update and to active services to the communications device. Accordingly, the communications device moves into an RRC connected state 204 but with the ECM Idle state because an EPS bearer has not yet been established. It is only after an EPS bearer has been established that the communications device 101 moves into an RRC connected and ECM connected state 206. A general illustration of the process by which data is communicated via an EPS bearer after a UE moves from an off state to an ECM connected and RRC connected state this shown in FIG. 5.

Figure 5:
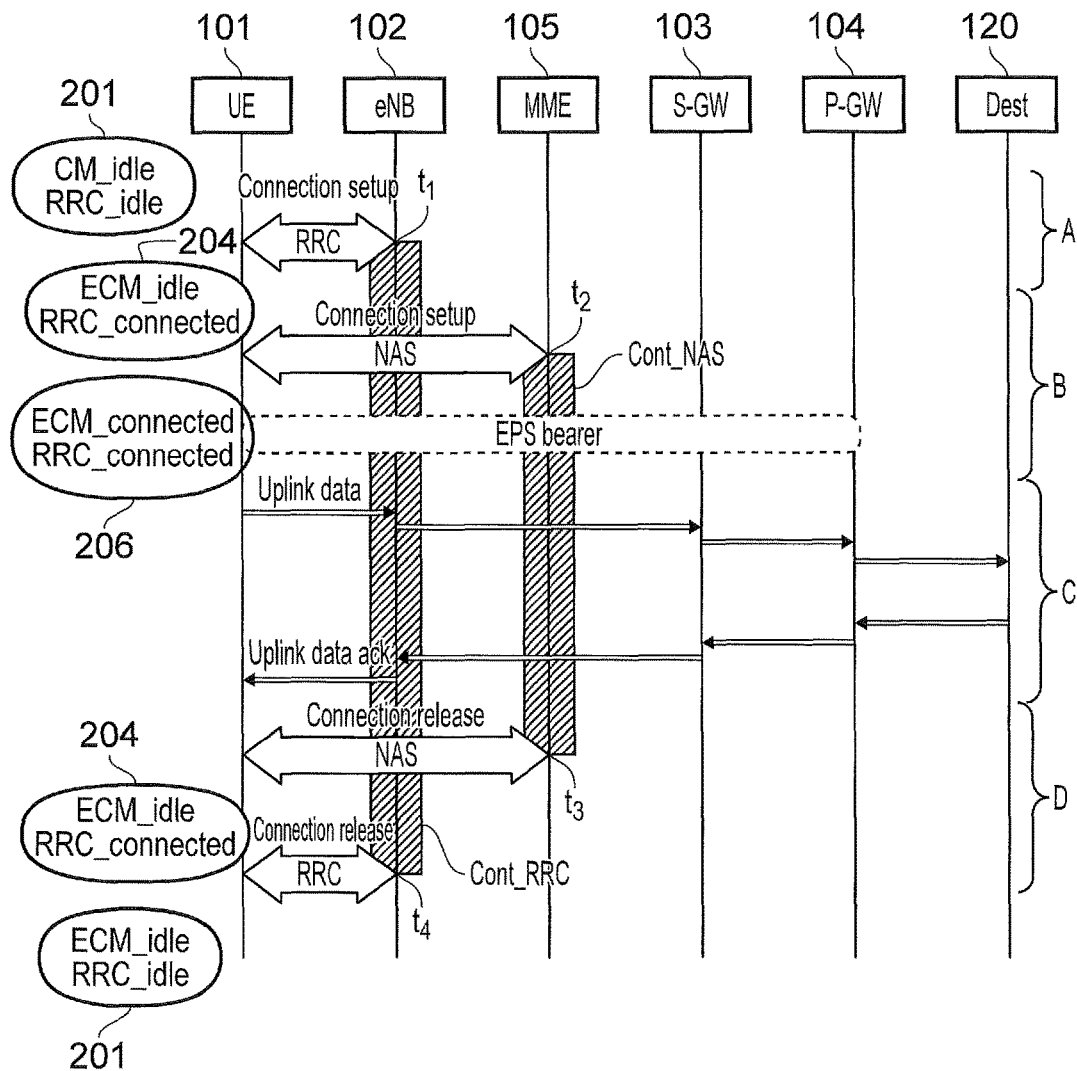
FIG. 5 is a simplified call flow diagram illustrating a process in which a communications device establishes and an EPS bearer for communicating data via the mobile communications network shown in FIG. 1.

FIG. 5 illustrates an example of the messages exchanged for setting up a connection from the communications device 101 to the destination 120, for using the connection to communicate data and for releasing the connection after the communications between the communications device 101 and the destination 120 have been completed. The call flow of FIG. 5 can be schematically divided into four steps A-D. Before step A starts, the communications device 101 is in the ECM_idle state which means that the communications device 101 is not currently communicating. At step A (messages 1-3) an RRC connection is set up between the communications device 101 and the eNB 102 for controlling communications between the communications device 101 and the eNB 102. Once this RRC connection has been successfully established, at step B (messages 3-12), the communications device 101 can establish a NAS connection with the MME 105. Following this NAS connection request from the communications device 101 to the MME 105, the MME sets up a connection (e.g. EPS bearer) between the communications device 101 and the P-GW 104, via the S-GW 103 and the eNB 102, and controls this connection. Although they have not been represented here, messages may also be sent to the P-GW 104, for example from the S-GW 103, for setting up the connection (e.g. EPS bearer) at the P-GW 104, for example the GTP tunnel and EPS bearer. At the end of step B, the communications device 101 has an EPS bearer set-up and available to send and receive messages and is therefore in the ECM-connected state. The call flow of FIG. 4 is an illustration and some of the messages may vary, for example depending on the EMM state before step A. For example, the communications device may be in EMM_unregistered state and switch to EMM_registered during step B, or may already be in EMM_registered before step A starts.

During step A, a RRC connection is setup between the communications device 101 and the eNB 102. Once this RRC connection has been set up, at time $t_1$, the eNB maintains an RRC context, referred to as Cont_RRC, for the duration of the RRC connection. In other words, until the RRC is released, the eNB will maintain this Cont_RRC. Such a context may for example include a communications device identifier (e.g. C-RNTI), power control settings, mobility settings, security settings, other radio settings or any other information. There will also be a corresponding context in the UE storing similar information pertaining to the operation of the radio layers, however, this is not shown in the diagram.

Once the RRC connection has been set up, a NAS connection is set up between the communications device 101 and the MME 105. Once this NAS connection has been set up, at time $t_2$, the MME 105 maintains a context for this NAS connection to the communications device 101, referred to as Cont_NAS, for the duration of the NAS connection. Such a NAS context may for example include a terminal identifier, a terminal's IP address, a current eNB, mobility settings, security settings, QoS settings, or any other information. As explained above, when the communications device 101 attaches/sets up a data connection via the mobile network, an EPS bearer is set up in the user plane between the communications device and the P-GW 104, the bearer being controlled in the control plane by the MME 105. There will also be a context in the UE storing UE related information pertaining to the NAS protocol. Note that the context Cont_NAS shown in the diagram as being stored at the MME, may include more information than just that used by or transferred in EPC NAS signalling procedures, it may also contain information pertaining to the session which has been gathered by the MME from for example, an HSS.

Once the RRC connection, the NAS connection and the EPS bearer have been set up, the communications device can send uplink data through the EPS bearer and to the destination. Even though in the example of FIG. 5, the communications device 101 sends uplink data, the same connection setup would occur for a downlink or for an uplink and downlink transmission. Likewise the path of an acknowledgement message has been illustrated in the example of FIG. 5 even though there may not be any acknowledgement message in other examples. As discussed earlier, this may for example be dependent upon the type of protocol(s) used for transmitting the data.

As can be seen in FIG. 5, Cont_RRC and Cont_NAS are maintained for the duration of the RRC and NAS connection (i.e. until they are expressly released with a connection release message exchange) and, as a result, the RRC context is used for every packet that eNB 101 receives from or sends to the communications device 101. Once the EPS bearer can be released, the NAS connection between the communications device 101 and the MME 105 is released at the same time. As a result, at the time $t_3$ where the NAS connection is released, the context Cont_NAS is also released. The tearing down of the NAS connection is followed by a tearing down of the corresponding RRC connection at time $t_4$. Again, as the RRC connection is released, the context Cont_RRC is also released.

At a point in time after completion of step C, the resources are released (step D). Step D could happen at any time after step C, for example just after message 20, or at a later point in time, for example after the communications device 101 stopped communicating for a predetermined time. The aim of step D is to release all unused connections, that is, to release the NAS connection between the MME 105 and the communications device 101 (also leading to the release of resources such as the GTP tunnel between S-GW and eNB and the EPS bearer), and to release the RRC connection between the communications device 101 and the eNB 102. Again, depending on whether the communications device 101 should remain in EMM_registered after step D or should switch to EMM_unregistered, the call flow for step D is likely to be affected. For example, the communications device 101 may remain in EMM_registered if the communications device simply releases the RRC connection, NAS connection and EPS bearer because it has been inactive for too long, or the communications device 101 may de-attach from the network and switch to EMM_unregistered (for example following a handover to a GSM network).

Protocol Stack within Network Elements

Figure 6:
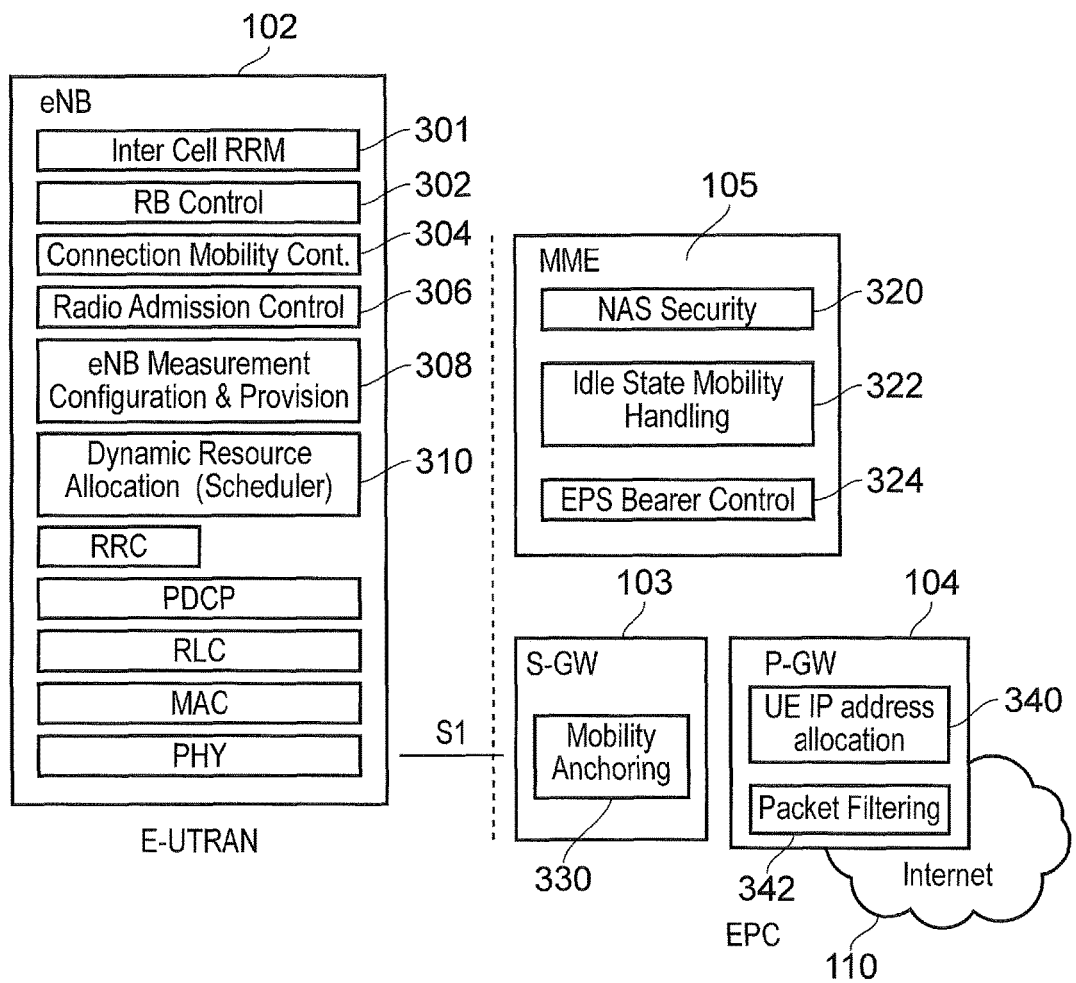
FIG. 6 is a schematic block diagram illustrating functions performed by infrastructure equipment of the mobile indications network shown in FIG. 1 to provide an EPS bearer.

As will be appreciated from those skilled in the art each of the network elements shown in FIG. 5 performs various functions in order to establish the EPS bearer and allow the communications device 101 to move from the EPM and RRC Idle states to the ECM connected and RRC connected states. This is achieved using various functions performed at each of the different protocol layers in both a user plane protocol stack and a control plane protocol stack. The functions performed by each of the network elements are shown in FIG. 6. As shown in FIG. 6 the eNB 102 includes and intercell radio resource management entity 301, a radio bearer controller 302, a connection management controller 304, a radio admission control 306, an eNB measurement configuration and provision entity 308 and a dynamic resource allocation or scheduler 310 which operate for example as explained in 3GPP document TS36.300 to provide radio resources to the communications device and to manage the connection and mobility. In respect of the control plane signalling the MME communicates signalling messages to the eNB 102 using an NAS security function 320, an Idle state mobility handling 322 and an EPS bearer controller 304. Control plane functions or NAS functions performed by the serving gateway include mobility anchoring 330 as well as UPI address allocation performed by the P-GW 104 340 and packet filtering 342.

Figure 7:
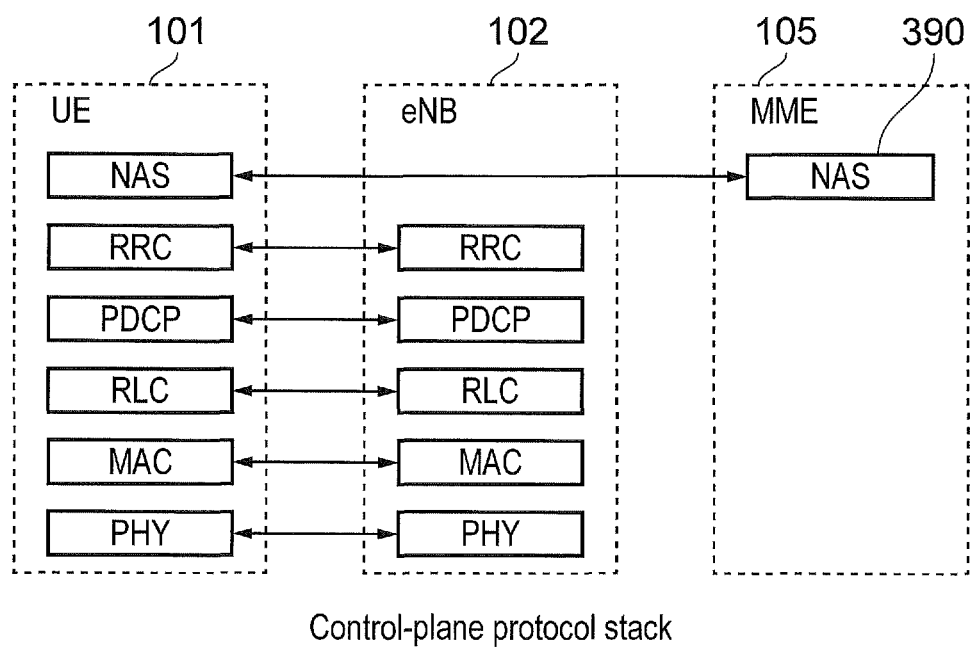
FIG. 7 is a schematic block diagram illustrating the protocol stack for a control plane of infrastructure equipment forming part of the mobile communications network shown in FIG. 1.

Correspondingly the protocol stack for the control plane entities illustrated in FIG. 7 which facilitate the non access stratum (NAS) signalling is supported by a protocol stack which includes a relay resource connection layer 400, a packet data conversions protocol layer 402, a radio link control layer 404, a medium access control layer 406 and the physical layer 408.

Figure 8:
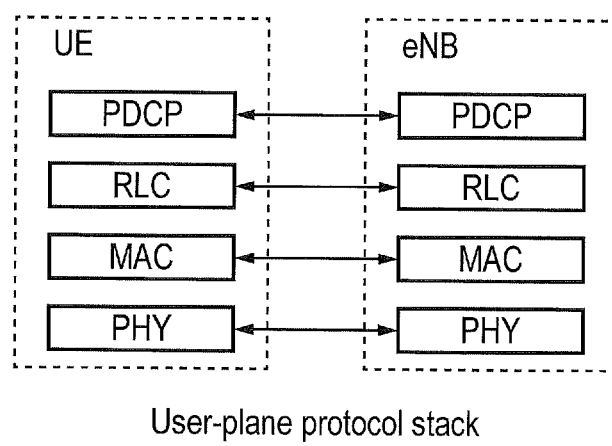
FIG. 8 is a schematic block diagram illustrating the protocol stack for user plane of a communications device (UE) and is a base station (eNB)

In contrast the user plane protocol stack is showing in FIG. 8 where corresponding elements showing in FIG. 7 are correspondingly labelled.

As will be appreciated by those skilled in the art, each of the layers in the protocol stack of the user plane and the control plane are required to monitor the current state of the transmission of data at each of the protocol layers in order to maintain for example security and data delivery to form the EPS bearer for communicating packet data from the communications device 101 across the mobile communications network to the destination 120.

Figure 9A:
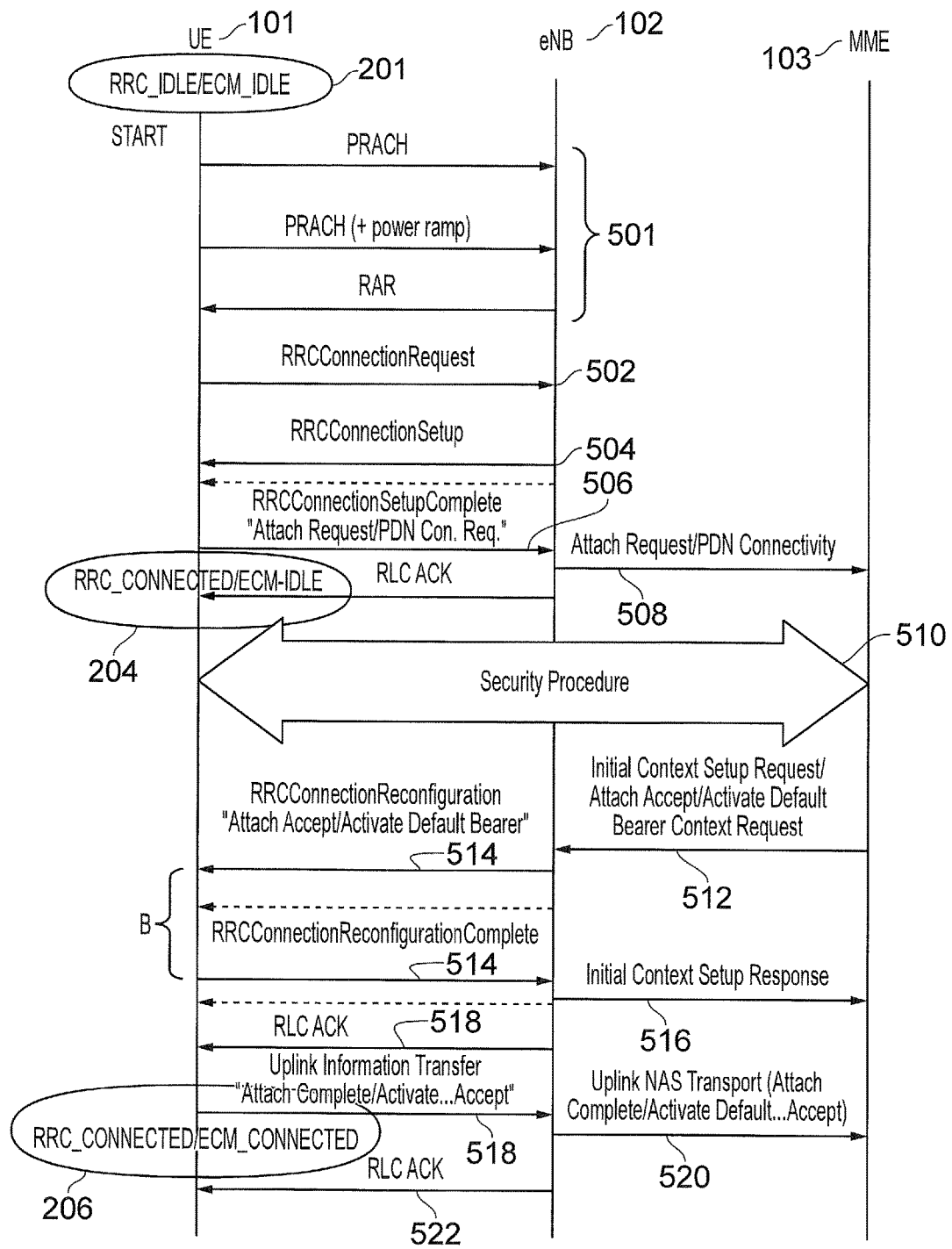
FIG. 9a is a call flow diagram illustrating an exchange of signalling messages between a communications device and infrastructure equipment of the mobile communications network shown in FIG. 1 to establish a communications context.
Figure 9B:
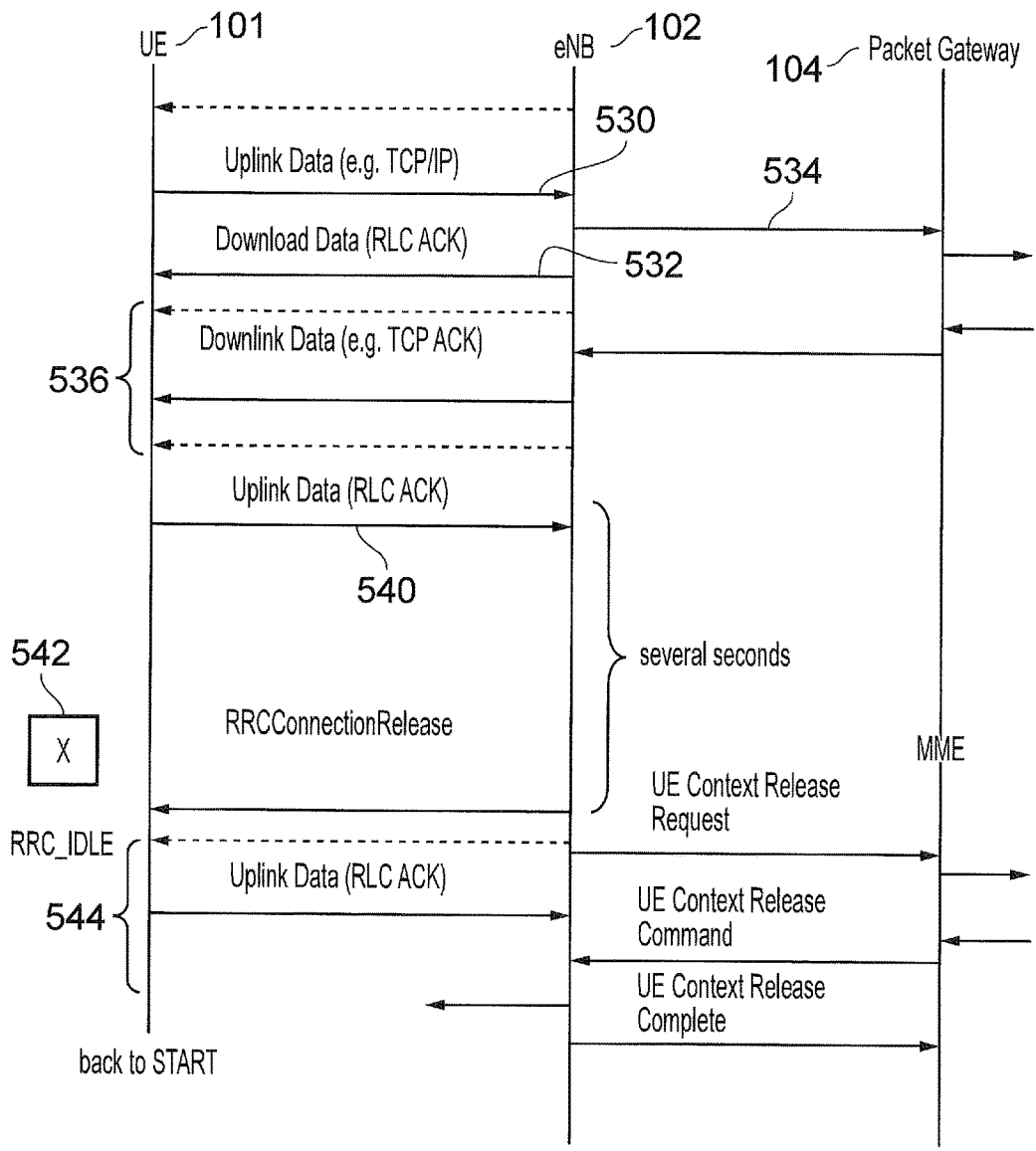
FIG. 9b is a corresponding call flow diagram illustrating an exchange of messages to release communications resources.

FIGS. 9a and 9b illustrate signalling transitions and messages which are required for the communications device 101 to pass from an RRC Idle and ECM Idle state to an RRC connected and ECM connected state back to the ECM Idle and RRC Idle state. In FIG. 9a from a start state, in which the communications device 101 is in the RRC Idle and ECM Idle state 201, the communications device 101 performs a random access procedure 501 in order to request and be granted uplink resources in order to transmit an RRC connection request message 502. The eNode-B 102 responds with an RRC connection set up message 504 and then an RRC connection setup complete message is sent from the communications device. At this point the communications device 101 is in the RRC connected but ECM Idle state. Following the RRC connection setup complete message, the communications device 101 transmits an attach request/PDM connection request to the eNode-B 102 506. The eNode-B 102 then forwards the attached request/PDN connectivity message 508 to the MME 105 in order to establish an EPS bearer. Following transmission of the attach request/PDM connectivity request 508 the MME 105 and the eNB 102 and the communications device 105, 102, 101 perform a security procedure 510 in order to authenticate the communications device. After this process a context is established for the communications device for the EPS bearer. Accordingly, the MME 105 transmits an initial context setup request/attach accept, activate default bearer context request 512 to the eNB 102 which then forwards an RRC connection reconfiguration or attach accept/active default bearer message 514. The communications device 101 then transmits an RRC connection reconfiguration complete message 514 and in response the eNB 102 transmits and initial context setup response message 516 to the MME 105. The eNB 102 transmits an RLC Ack message 518 to the communications terminal 101. The communications device 101 then transmits an uplink information transfer attach complete/active accept message 518 which prompts the eNB 102 to transmit an uplink NAS transport (attach complete/active default accept message 520). After this message the eNB 102 transmits an RLC Ack message 522 at which point the communications device moves to the RRC connected/ECM connected state 206.

FIG. 9b shows the message flow for moving from the RRC connected and ECM connected states to the RRC Idle and ECM Idle states corresponding the call flow diagram showing in FIG. 9a. As shown in FIG. 9b the communications device 101 is transmitting uplink data using transmission messages 530 which are acknowledged by the eNB 102 with a downlink data message 532 providing an RLC Ack. The data transmitted on the uplink to the eNB 102 is then forwarded to the PGN 104 via the established EPS bearer 534. It then follows a TCP Ack transmitted on the downlink and messages associated with a transmission of acknowledgement of downlink data transmissions 536. After the communications terminal 101 has transmitted an uplink data RLC acknowledgement message 540 which could be the final data transmission for the uplink by the communications device 101, the communications device 101 may determine that there is no more data to send as represented by the box X 542. Only the eNB (communication device 102) can release the RRC connection, provided for the communications device 102, using an RRC connection release message by detecting a period of inactivity. Releasing the RRC connection will normally be the context at the eNB and MME (however this is dependent on network implementation). This release follows and exchange of messages 544 to release the RRC connect and also release the communications context of the communications terminal 101 using messages exchanged between the eNB and the PGW 104.

Power Saving State from Connected

As explained above, example embodiments can provide an arrangement in which a communications device can be configured to enter a power saving state from either the RRC connected state or the RRC idle state. In some examples the communications device can be configured under the control of the communications network to enter the power saving state from the idle state or the connected state. This configuration can include identifying operations that the communications device can perform in order to enter the power saving state, which may depend on the state transitions from either the idle or the connected states. The operations performed by the communications device may also depend on the state transitions of the communications device from the power saving state to the idle or the connected states. More detail will be provided in the following sections, which provide an explanation of how a communications device may be configured to enter a power saving state and the preconditions for entering the power saving state. However the following paragraphs provide an explanation of how a communications device can be arranged to transition from the connected state to a reduced power state, which is also disclosed in our co-pending UK patent application 1307186.5, the contents of which are incorporated herein by reference.

According to the present technique embodiments of the present disclosure are arranged such that a mobile communications device enters a reduced power state when predetermined conditions are met. The reduced power state may be termed a "statis state", because when the transition is from the connected state to the reduced power state, because the context information associated with the communications device's connection is stored because the communications terminal may transition back to the connected state. However other terms may be used such as "power saving state", "dormant state", "sleep state" or any other term suggesting a lower level of activity than the usual activity states.

Figure 10:
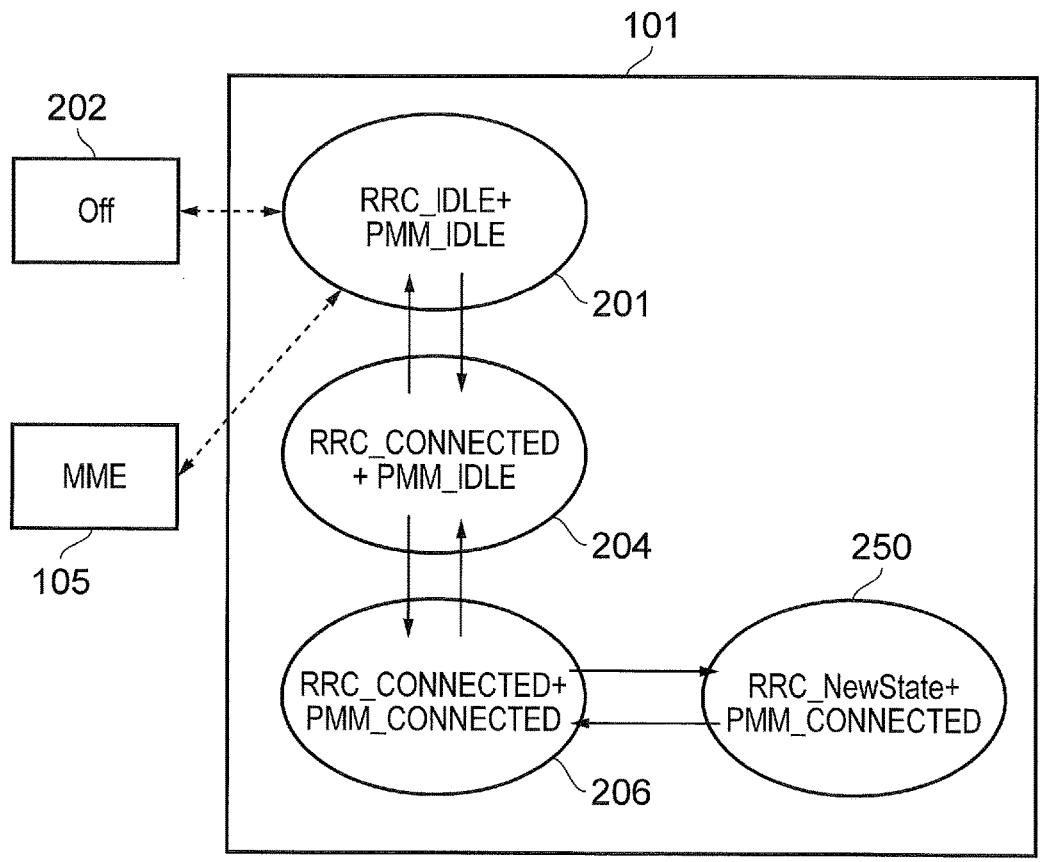
FIG. 10 is a schematic illustration of a state diagram of a communications device operating in accordance with the present technique which includes a new power saving state.
Figure 11:
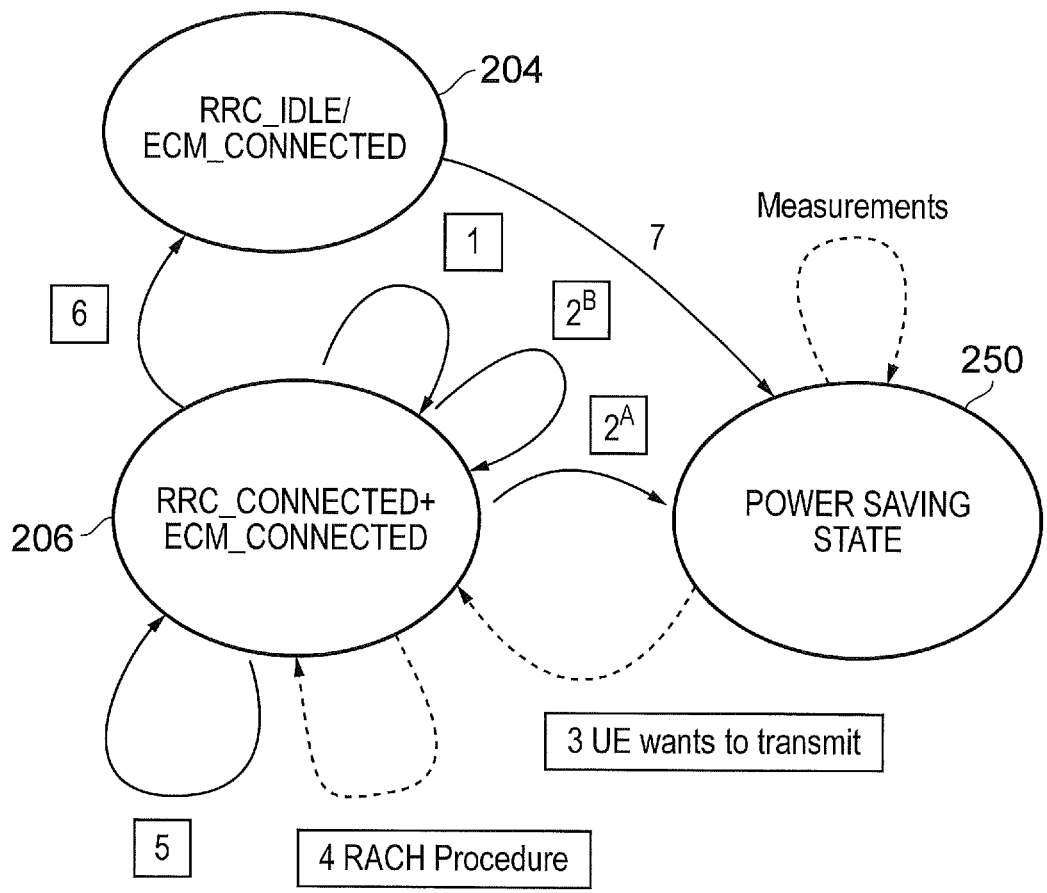
FIG. 11 is a schematic illustration of state transition diagram of a communications device which transitions to a power saving state in accordance with the present technique.

For example one of the predetermined conditions may be that the communications device is instructed to enter a reduced power state by the wireless access network. In another example of the predetermined conditions for entering a reduced power state, the communications device may no longer have data or signalling to send or receive for a predetermined time. In one example in which the communications device detects that it can or should enter a reduced power state, the communications device may transmit a signal to the mobile communications network and more particularly in the present example to an eNB 102. For this example, the eNB 102 having also detected the reduced power state may receive a message and, in order to avoid having to perform all of the signalling required to set up an EPS bearer again, the current state of each of the protocol stacks for the current EPS bearer are saved by the eNB and other network elements. Accordingly, for example the communications device 101 retains the connection identifier which is used by the network to support the RRC connection and ECM connection state such as for example the CRNTI. In another embodiment, the transition from RRC Connected to power saving state may include a release of the resources and RRC Connection, resulting in the communications device only being able to return from the power saving state to the Idle state, and must perform a full RRC Connection establishment in order to move back to RRC Connected. FIG. 10 provides an example of the present technique in which the communications device 101 includes a reduced power state for the RRC state. Thus as shown in FIG. 10 which corresponds to FIG. 4, an example reduced power state 250 is provided to an adapted communications device 101 in order to allow the communications device 101 to transition from an RRC connected state to a reduced power or sleep state in which power consumption is reduced. As will be explained shortly in other examples the communications device 101 may transition from the RRC idle state to a reduced power state. However, when transitioning from the RRC connected state, the state of the protocols within the protocol stack on both the eNB 102 and the UE 101 may be effectively frozen and stored and the C-RNTI for the UE is saved by the eNB pending further communications. However, the physical radio resources are released. Alternatively the transition from RRC Connected to power saving state may include a release of the resources and RRC Connection, resulting in the UE only being able to return from the power saving state to the Idle state A state diagram showing the changes of the state by the communications device to reach the reduced power state 250 is shown in FIG. 11, where the states are numbered in correspondence with those of FIGS. 4 and 10. The message state flow is summarised with respect to the numbering of the state transitions shown in FIG. 11 as follows:

1. A communications device determines, in accordance with predetermined conditions, to enter a reduced power state 250 in which the power of the communications device is reduced by suspending or reducing the performance of one or more functions. For example, one of the predetermined conditions may be that the communications device has no more data to transmit on the uplink to the communications network or that it does not expect to receive any further data on the downlink. In the latter case the communications device may receive a message on the down-link that it should enter a power saving state. The point at which the communications device or the communications network therefore decides that it has no more requirements for communications resources is identified with the point "x" in FIG. 9b. In one example, in order to enter an RRC power saving state 250, the communications device 101, whilst in the RRC connected and ECM connected state 206, transmits an RRC stasis request message in state 206 before it can transition to the RRC stasis and ECM connected state 250. However in other examples, the communications device 101 may receive a message from the eNB 102 instructing it to enter the power saving state.

2a. In some examples the communications device may then receive an RRC power saving state confirm message, RRC Connection Reconfiguration or RRC Connection Release message and moves from the RRC connected/ECM connected state 206 to the power saving state 250 and either the ECM connected state or the ECM Idle state.

2b. In some circumstances the communications device 101 may receive an RRC power saving reject message from the communications network, or may receive no response, for example where the communications network finds that it now has data to send to the communications device or if the stasis mode for both the eNode-B and the communications device is not supported by the mobile communications network.

3. The communications device then decides that it should transmit data for example, as a result of new data being ready to be transmitted in the device's packet data buffer or as a result of periodic tracking are update timer expiry. Thus having received a packet for transmission the communications device needs to move back to the RRC connected and ECM connected state 206. Another reason for moving back to the RRC connected and ECM connected state 206 is that measurements performed by the communications device might indicate that it should hand over to another eNode-B in which case a communications device must be in the RRC and ECM connected state 206.

4. The communications device initiates the RACH procedure for example the MAC layer transmission described in section 5.1.5 of TS36.321. This essentially involves transmitting random access message using contention access as it conventionally arranged with mobile communications network. The PRACH includes the CRNTI which was previously stored by the communications device and by the eNB 102. As such when the eNB receives the CRNTI of the communications device in the PRACH message the eNB can immediately recognise that the communications device transmitted the PRACH message and also recognised that the communications device 102 concerned is currently in the power saving state 250. The eNB therefore moves the communications device back to the RRC connected ECM connected state 206 and transmits an RRC connection re-establishment request message to the communications device 101.

5. Therefore on completion of the RACH procedure (RAR received) communications device transmits the RRC connection re-establishment request message to the eNB 102. On receipt of the RRC connection of establishment message the communications device has then successfully re-established the RRC connection and moves to the RRC connected/ECM connected state 206.

6. If the communications device receives an RRC connection re-establishment reject message then a communications device transitions back to the RRC Idle but ECM connected state 252.

7. In other examples as will be explained below, the communications device can move from the RRC Idle state to the power saving state 250, in accordance with predetermined conditions. However once in the power saving state 250, the communications device 102 cannot move to the RRC connected state without establishing a context and so must perform an RRC connection establishment.

Figure 12:
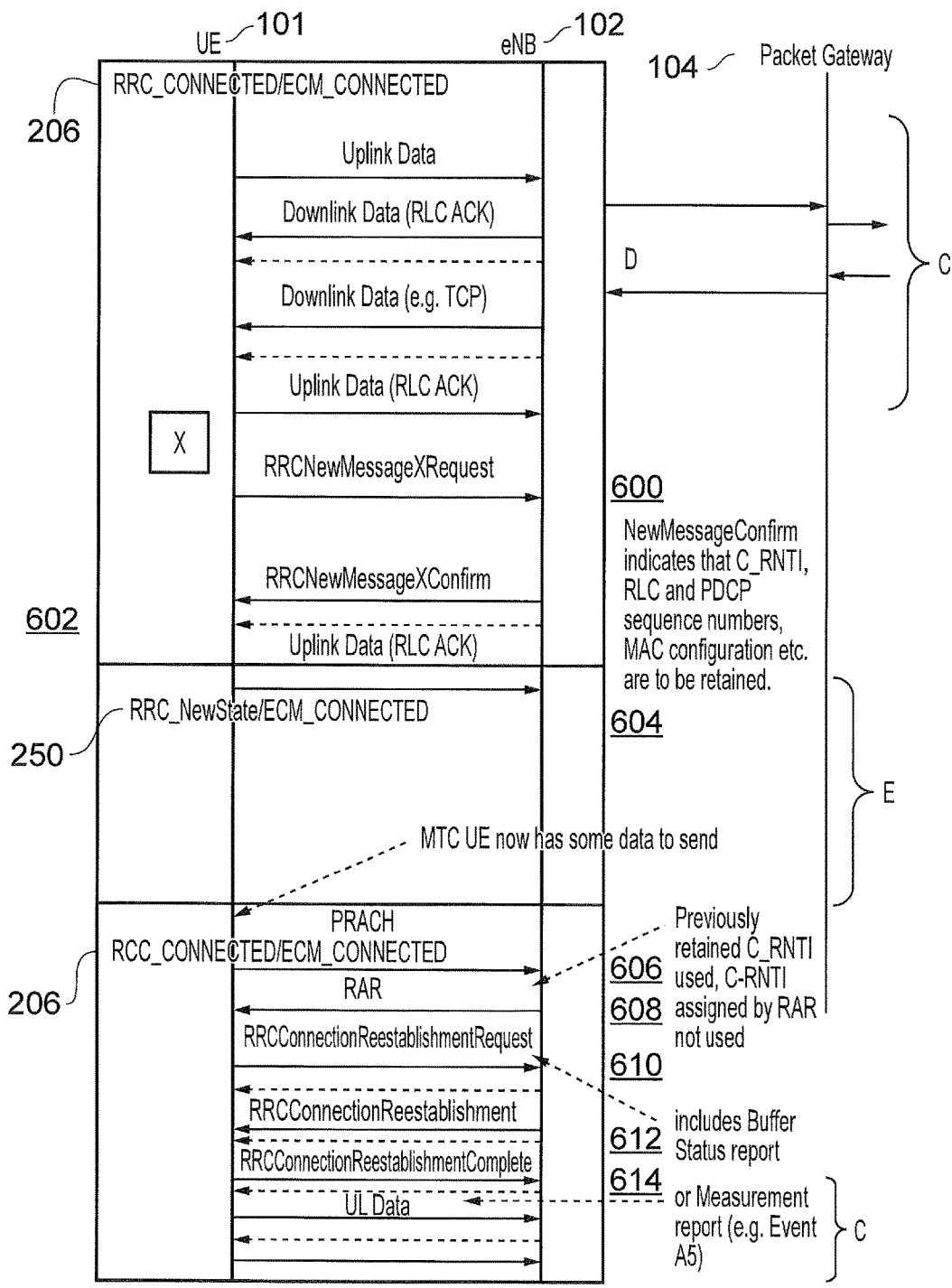
FIG. 12 is a call flow diagram illustrating an exchange of messages which includes the operation of a communications device which enters a power saving state in accordance with the present technique.

A call flow diagram corresponding to the call flow diagrams shown in FIGS. 9a and 9b but adapted to include the call flow messages associated with a transition to the reduced power state 250 is shown in FIG. 12. FIG. 12 is now summarised as follows:

Starting from the RRC connected/ECM connected state 206 the communications device 101 transmits data packets on the uplink and receives acknowledgment on the downlink or receives downlink data packets and transmits acknowledgements on the uplink as explained with reference to FIGS. 5, 9a and 9b. This effective therefore forms part of section C of the flow diagram of FIG. 5. At point X in FIG. 12 the communications device 101 detects one or more of the predetermined conditions for entering a power saving state, for example that it has no more data packets to transmit. For this example the communications device transmits an RRC stasis message request or UE assistance information message 600. If the communications network can support the new power saving state then the communications network transmits an RRC stasis message confirm or RRC Connection Reconfiguration or RRC Connection Release message to the communications device 101 as message 602. At this point both the communications device and the eNode-B may confirm that the CRNTI the RLC and PDCP sequence numbers and the MAC configuration etc. are to be retained and stored so that effectively the EPC bearer moves into a power saving state in that it still exists but there are no packets being transmitted via the EPS bearer. Alternatively when in the power saving state the communications device could release the CRNTI the RLC and PDCP sequence numbers and the MAC configuration pending a return from the power saving state to the Idle state.

Accordingly, when the communications terminal transmits data packets again via the EPS bearer there may be no need to re-establish the tunnelling between the various nodes of the communications network in order to establish the EPS bearer. The communications device 101 then transmits a RRC stasis ECM connected message 604 to the eNB to confirm that it has entered the power saving state. Therefore in a period E the communications device has entered the power saving state 250.

Whilst in the power saving state 250 the communications device may detect that it needs to move back to the RRC connected and ECM connected state 206. This can be to transmit data from the uplink because the communications device detects that it has new packet data to be transmitted. Alternatively, in case the power saving state is configured to monitor paging occasions, the network may detect that it may need to transmit on the downlink and therefore signals to the communications device using a conventional paging message that it needs to move back to the RRC connect and ECM connected states. Alternatively, the communications terminal which continues to monitor neighbouring base stations and may decide that it needs to hand over or reselect to one of the neighbouring base stations as a result of measurement of radio link quality being taken in accordance with a conventional handover or reselection arrangement.

Again, this would require the communications device 101 to move back to the RRC connected/ECM connected state 206 or the idle state. In order for the communications device 101 to move back to the ECM connected/RRC connected state 206, the communications device transits a PRACH message. The communications device receives but then discards the C-RNTI assigned via the RAR message 608 and uses the retained C-RNTI. The C-RNTI which was retained should not be used by any other communications device. Accordingly the eNB 102 reserves the C-RNTI for the communications device during a time when the communications device is in the power saving state so that this is not allocated to another communications device in the cell. The RRC connection request re-establishment request message 610 sent by the communications terminal 101 includes the retained C-RNTI. The RRC connection re-establishment request message may include an indication of a status of the packet communications buffer stasis. The eNode-B 102 then transmits and RRC connection re-establishment message 612 to the communications device 101 which responds with an RRC connection re-establishment complete message 614. At this point the communications device has returned to the RRC connected/ECM connected state 206 and transmits data on the uplink in accordance with a conventional operation identified as a phase C shown in FIG. 5 and also in the first part of FIG. 12.

As will be appreciated by transitioning to the power saving state the communications terminal can release its radio communications resources and enter a power down state thus saving power. However, if there is new data to be transmitted communications device does not have to proceed through the entire message exchange shown in FIGS. 9a and 9b in order to communicate packet data again. This is because the stats of the protocol stacks are retained for example the RLC layer and PDCP sequence numbers are maintained as well as the MAC configuration for the communications link. In addition on the network side the EPS bearer is also retained and just needs to be reactivated by transmitting data packets in a conventional arrangement. Accordingly, it is possible to reduce network resources consumed the result of signalling and reduce an amount of redundant information which is communicated in order to establish the EPS bearer.

Power Saving State from Idle

Figure 13:
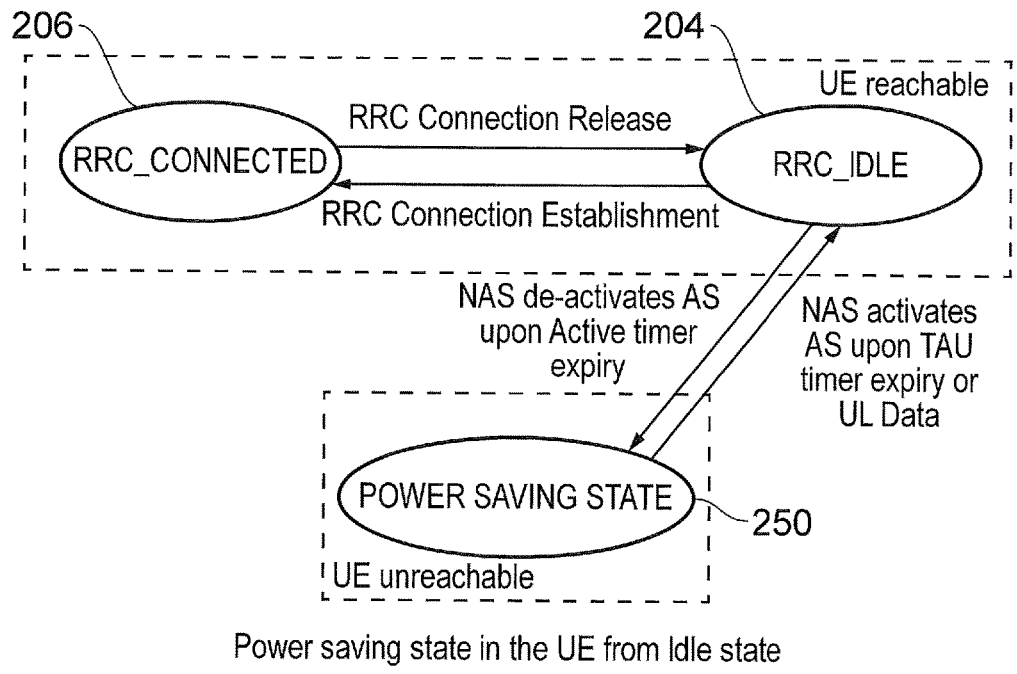
FIG. 13 is a schematic illustration of state transition diagram representing the operations of a communications device which transitions to a power saving state from an Idle state in accordance with a previously proposed arrangement.

As indicated above with reference to FIG. 11, a power saving state 250 can be entered from the Idle state 204. One example of a transition from the Idle state to a power saving state 250 will now be explained in more detail. FIG. 13 provides an example of a previously proposed power saving state which can be specified as a new RRC state or a new sub-state of Idle mode, which is applicable for both EUTRAN and UTRAN. This is disclosed in 3GPP Technical report TR 37.869 and in TR23.887v0.10.1, section 7.1.3.3 "Power Saving State for Devices", the content of which in incorporated herein by reference.

According to the example illustrated in FIG. 13, a communications device can move to a power saving state, after an active time period. For example a timer which is started when the communications device moves to the idle state 204, is used to measure when the device has remained in the Idle state 204 for a predetermined period without performing any data or signalling transmission or reception, so that the timer is effectively an inactivity timer. This can be referred to as a non-access stratum (NAS) timer, which is a known timer added to support a power saving state in Idle mode. After the predetermined period (NAS time period) the communications device can drop into the power saving 250.

In the power saving state the communications device can remain attached. However, all access stratum (AS) functionalities stop, that is to say that, when the access stratum layer is deactivated by the NAS layer, the communications device stops all access stratum procedures.

The communications device is reachable for down-link data during the time that the UE is in RRC/S 1 connected state and during the active time period (i.e. via paging). The communications device wakes up, going back to the Idle state 204, when the device has up-link data pending or when it needs to perform a tracking area update (TAU).

As indicated above, when the communications device enters the power saving state 250 from the Idle state 204, or when the transition from RRC Connected to power saving state includes a release of RRC Connection, it does not have a communications context and therefore does not have an RRC connection. As such to move from the power saving state 250 to the connected state 206, the communications device 101 must either perform an RRC connection establishment from the power saving state 250 or transition back to the Idle state 204 before moving to the connected state 206.

According to the present technique, when one or more predetermined conditions are satisfied, a communications device may enter the power saving state, in which the power consumption may be reduced by either suspending some operations which the communications device would normally perform or reducing the performance of some functions. As such the EUTRAN RRC state may be configured to behave in accordance with the power saving state. This allows the power saving state to be adaptable for different types of MTC applications/devices or smartphones and also different network deployment scenarios.

According to the present technique, at least one of the following properties may be configured in a power saving state:

Allowable state transitions
  UE may be configured to be allowed to enter and/or leave a power saving state from idle mode;
  UE may be configured to be allowed to enter and/or leave the power saving state from connected mode. If the UE is allowed to leave the power saving state directly to RRC Connected, then some resource and context information must be stored such as C-RNTI when the UE leaves RRC Connected to power saving state. Otherwise all context information should be released and deleted when moving from RRC Connected to power saving state.
  UE may be allowed to do both, or any combination of entering/leaving from idle and/or connected.
State transition mechanism
  UE may be configured to enter the power saving state only when explicitly commanded by the network from an RRC connected mode
  UE may be configured with a data inactivity timer after which the UE shall enter the power saving state from idle and/or connected mode
  UE may be required to send a request to the network to enter the power saving state
    This may be timer based, or based on internal UE event (UE implementation dependent method to determine no more data transfer is needed)
  UE may be required to periodically leave the power saving state and return to the RRC connected, for example by performing a tracking area update, to go to RRC connected mode for a short period of time
  UE may be allowed to leave the power saving state only when determined by the UE, for example based on an internal mechanism, or based on measurement event
Discontinuous Reception (DRX) behaviour or dormant behaviour.
  If DRX is configured, the UE must perform measurements and listen to paging occasions during it's time in a power saving state. The DRX length is likely to be configured to a longer period than connected (or idle) states in order that the UE can save more power.
  If the power saving state is configured, when the UE enters this power saving state it behaves as if the Access Stratum (AS) is switched off. This offers a greater power saving, however it is more suitable for MTC devices, which do not need to be paged with any high latency.
Mobility.
  UE may be configured in one power saving state so that mobility is reduced or not required (e.g. stationary device), so that all functions associated with measuring neighbouring base stations and determining whether to handover to another bases station are disabled
  UE may be configured to perform idle mode cell reselection
  UE may be allowed not to perform mobility, until UE needs to return to a normal activity state, in which case TIE may be required to perform measurements and perform cell selection/reselection or measurement report before exiting the state
  UE may be configured to perform e.g. RSRP measurements, and exit the state in case any measurement event/cell reselection criteria is met, in order to send a report to the NW or reselect to a new cell (also trigger condition for state change)—maybe configurable depending whether UE is moving or stationary.
Measurement may be used to trigger which state transition the UE should make, for example, still in coverage of the same eNB→transition to connected, out of coverage→transition to idle to perform a reselection.

Configuration of Power Saving State

Figure 14:
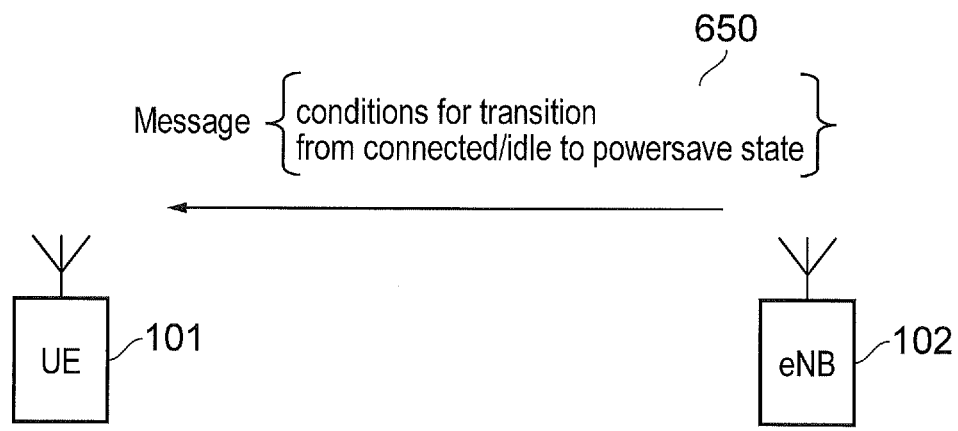
FIG. 14 is a schematic illustration of an example of signalling messages providing an indication of power saving power saving states being transmitted from a base station (eNodeB) to a communications device (UE)
Figure 15:
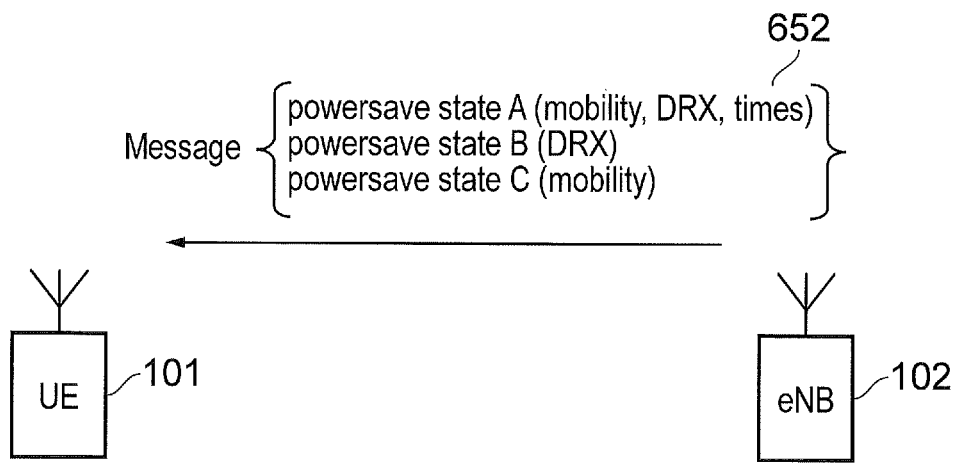
FIG. 15 is a schematic illustration of an example of signalling messages providing an indication of conditions for entering one or more power saving power saving states being transmitted from a base station (eNodeB) to a communications device (UE)
Figure 16:
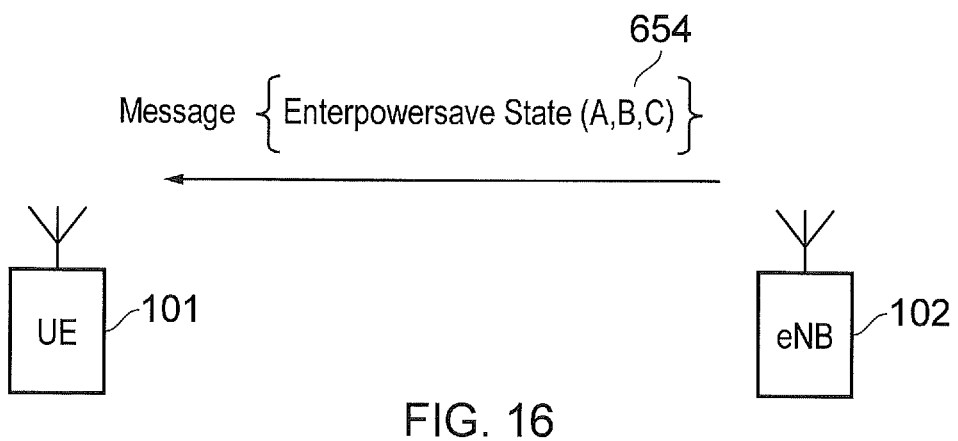
FIG. 16 is a schematic illustration of an example of a signalling message instructing a communications device to enter a power saving power saving state being transmitted from a base station (eNodeB) to a communications device (UE)

According to one example, the network may signal the different preconditions for transitioning from the idle/connected states to the power saving state. As shown in FIG. 14, an eNB 102 transmits first signalling information via one or more messages 652, which indicates to the communications device (UE) 101 one or more conditions for changing from the idle or the connected state to the power saving state. Correspondingly FIG. 15 provides an example in which the eNB 102 transmits second signalling information via one or more messages 654, which indicates to the communications device (UE) 101 one or more power saving power saving states which may be used. For example the power saving state A may specify reduced mobility, power saving periods, whereas power saving state B may specify an extended DRX cycle or functions which may be disabled during a period when the receiver is in-active and not receiving, as indicated above. As a further example, FIG. 16 illustrates an arrangement in which the network signals to the UE 101 that it should enter one of the power saving states using a signalling message 656.

Figure 17:
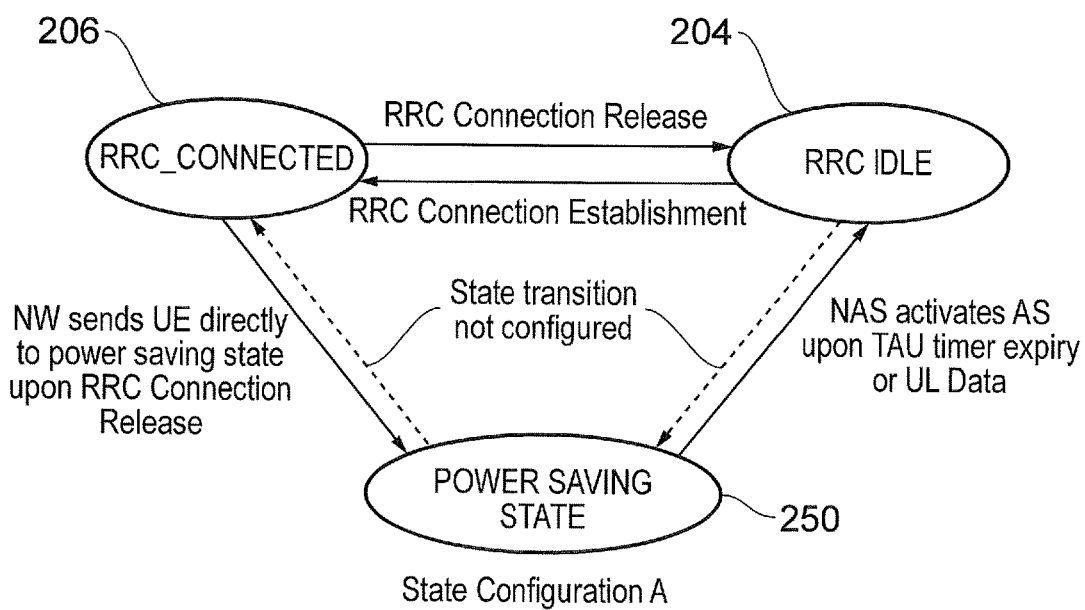
FIG. 17 provides a representation of a first state diagram of a communications device operating in accordance with the present technique.
Figure 18:
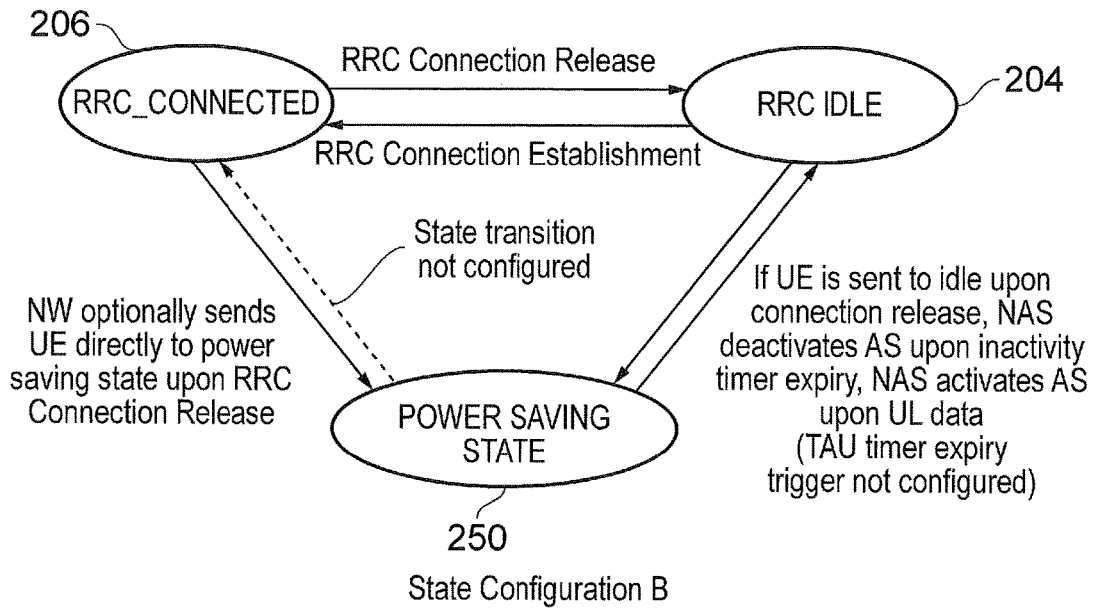
FIG. 18 provides a representation of a second state diagram of a communications device operating in accordance with the present technique.
Figure 19:
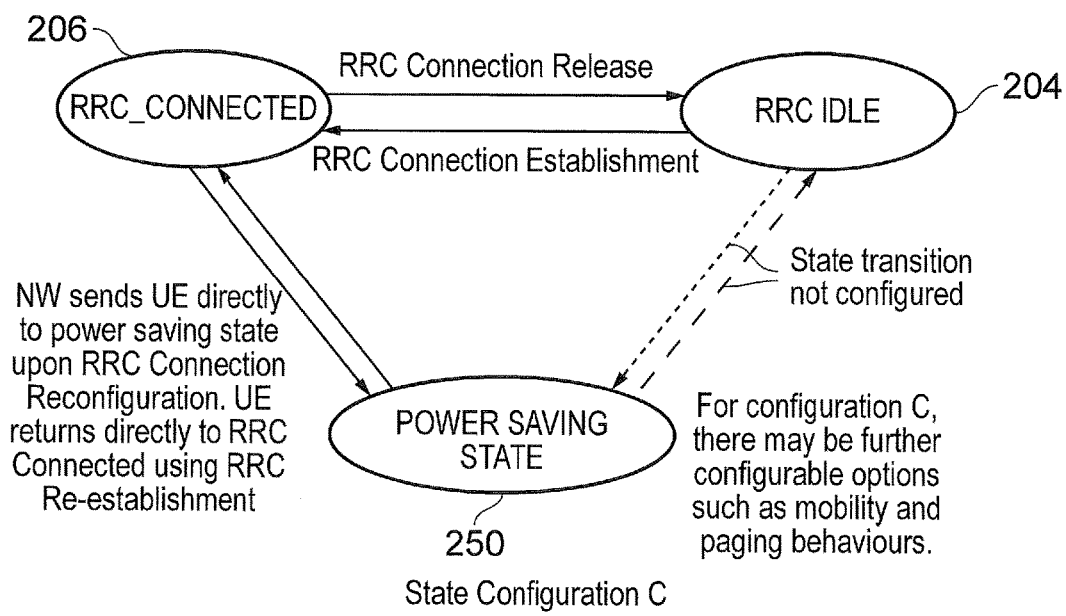
FIG. 19 provides a representation of a third state diagram of a communications device operating in accordance with the present technique.

FIGS. 17, 18 and 19 provide an example in which the state transitions of the UE 101 as signalled using the signalling messages 650, are specified to allow only certain of the possible transitions as explained above. For example as shown in FIG. 17, there is no NAS inactivity timer configured, therefore if the UE is released to idle mode, the UE will never automatically move to power saving mode, but rather will do this only upon command from the wireless communications network. This provides the network with a per-UE and per-connection control of when the UE goes to power saving state, and allows this without wasting power waiting for expiry of an inactivity timer. In one example the UE enters the idle state when leaving a power saving power saving state, when up-link data needs to be sent, or at the latest when periodic TAU expires.

For the example state transitions shown in FIG. 18, and as explained above with reference to FIG. 13, the UE is configured with a NAS inactivity timer, and can move from idle to a power saving state upon expiry. It is likely that the wireless communications network will not use RRC Connection release to move to a power saving state, but rather rely on inactivity times from the UE. This provides an advantage that the UE does not need to indicate any assistance information while in connected mode, that the UE would like to go to a power saving state. The TAU timer might be disabled to allow for longer times in power saving state without having to perform periodic registration, which can potentially be disabled also in the example shown in FIG. 17.

One example of this arrangement could be for example that the NAS inactivity timer is used to indicate that the communications terminal should use the power saving state (basic reduced functions would be switching off AS completely). If timer is set to 0 then UE can only go directly from connected→connection release→power saving, and not use idle→power saving transition. If timer is >0 then communications device can go from idle when the timer expires. Then the timer would therefore indicate the communications device should use the power saving state that switches off AS functions.

In one implementation, the arrangement shown in FIGS. 17 and 18 which does not allow for some state transitions from or to the power saving power saving state is achieved by arranging for the NAS periodic timer to be enabled or disabled or set to 0, hence enabling or disabling the transition from idle to power saving power saving states. If disabled, then the only way for the UE to move to power saving would be via RRC Connection Release.

A further example is provided in FIG. 19, in which a further option is illustrated which might be more widely applicable to other example applications than for example a power saving power saving state configuration for an MTC device, perhaps for example for smart phones. If the state transition from power saving state to connected state 206 is enabled, then the communications device would have to store context and resource information when moving from the connected state 206 to a power saving state. Mobility and paging behaviour may also be needed as configurable options. In one implementation the same RRC state may be configured in a different way, rather than introducing further RRC states.

Figure 20:
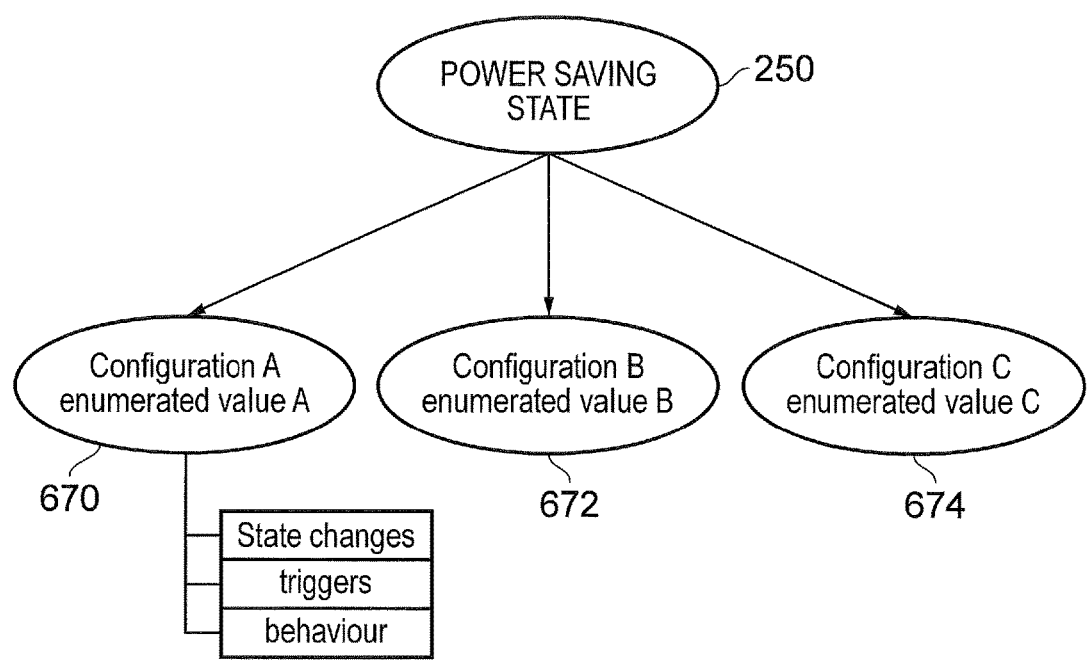
FIG. 20 provides a representation of a power saving power saving state providing a plurality of different power saving states or sub-states of a communications device operating in accordance with the present technique.
Figure 21:
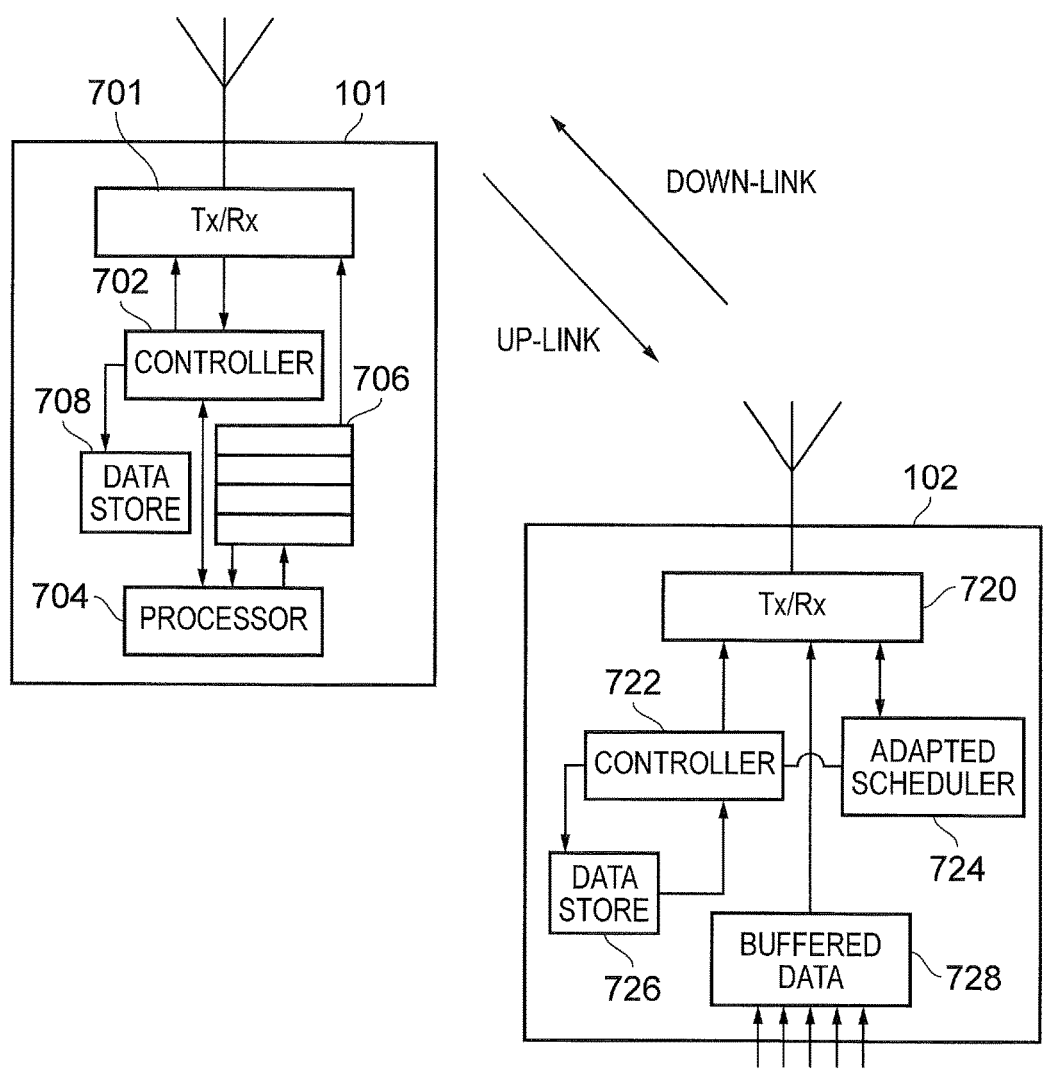
FIG. 21 provides a schematic block diagram of a communications device and a base station configured in accordance with an example of the present disclosure.

FIG. 20 provides an illustration of different power saving states 250, which may be signaled to the communications device 101 by the messages 652 shown in FIG. 14 or predefined within the communications device. As shown in FIG. 20, three power saving states 670, 672, 674 are shown. In one example, each of the states 670, 672, 674 may be signaled using an enumerated type signaled to the communications device 101. This may be provided using network system information, or in dedicated signalling, which provides an indication of the state behaviour the communications device should use for power saving state). Each of the configured sub-state has pre-defined properties (either hard-coded in the specification, or configured via system information such as the allowed state changes, the state change triggers, and other behaviour such as mobility and paging behaviour.

As will be appreciated if the communications device is transitioning from the idle mode to the power saving state then no context exists for communicating data as explained above. Accordingly in the power saving state the state of the protocol stacks and the identity numbers for identifying the communications device with respect to a communications bearer do not exist and so are not stored. As will be appreciated from the explanation provided above, embodiments of the present technique can provide an advantage in that configurable state transition behaviour can make power saving state more controllable and more flexible and so more available for different applications. As such the communications network can more easily control the behaviour of the communications device and different behaviour is more suitable for different network vendors and device types. Furthermore some configurations can save more power and/or signalling overhead but are applicable only for MTC devices, whereas other configurations are more suitable for use with smartphones, but do not save as much power.

EXAMPLE IMPLEMENTATION

A diagram of an adapted communications device 101 and eNB 102 which provides an example embodiment of the present technique is shown in FIG. 20.

As shown in FIG. 20, a communications device also referred to as a UE 101 comprises a transmitter and receiver unit 701 and a controller 702. The controller 702 controls the transceiver unit 701 in order to transmit and receive data which is fed to a processor 704 which hosts applications programs and other processes for providing user services and for controlling the communications device 101. Data transmitted on the down-link and received for transmission on the up-link by the communications device 101 is fed to a data buffer 706. The data buffer 706 buffers the data packets for transmission on the uplink to the mobile communications network or buffers data packets received on the downlink which are transmitted from and the eNB 102 to the communications device 101. As explained above when the communications device enters the power saving state from the RRC connected state but not the idle state, the state of the protocol stacks including sequence numbers, security keys etc are stored in a data store 708 with a channel identifier such as a C-RNTI are stored. This information, which is related to the communications context of the communications device can be used to reactivate the communications context of the communications device 101 which has been used to transmit data packets on the uplink or receive data packets on the downlink via the EPS bearer across the mobile communications network, which is associated with the communications context.

Also shown in FIG. 20 is a base station or eNB 102, which comprises a transmitter and receiver unit 720 and a controller at 722. An adapted schedulers 724 is used to schedule the allocation of uplink and downlink communications resources in accordance with a conventional operation. However in combination with controller 722, when a power saving state message is received from a communications device 701 (power saving state initiated by the UE) or if the eNB 102 instructs the UE to enter a power saving state, from the connected state, then, in one example, the controller 722 arranges for the corresponding state of the protocol stack associated with the EPS bearer establish for the communications device to be stored in a data store 726. The communications buffer 728 is provided to buffer data packets received from respective EPS bearers for transmission to communications devices within a cell served by the eNB 182. Therefore, as explained above, once a power saving state message is detected by the controller 722, a scheduler 724 releases communications resources allocated to communications terminal 101 which has entered the power saving state and the controller 722 may store the state of the protocol stack including sequence numbers and security keys.

Various further aspects and features of the present disclosure are defined in the appended claims. Various combinations of the features of the dependent claims may be made with those of the independent claims other than the specific combinations recited for the claim dependency. Embodiments of the present disclosure have been defined largely in terms of reduced capability devices transmitting data via a virtual carrier inserted in a conventional LTE based host carrier. However, it will be understood that any suitable device can transmit and receive data for example devices which have the same capability as a conventional LTE type device or devices which have enhanced capabilities.

The following numbered clauses provide further example aspects and features of the present technique:

1. A communications device for transmitting data to and receiving data from a mobile communications network, the mobile communications network including one or more network elements providing a wireless access interface for communicating with the communications device, the communications device comprising:

a transmitter unit configured to transmit signals to the mobile communications network via the wireless access interface provided by the one or more network elements of the mobile communications network, and a receiver unit configured to receive signals from the mobile communications network via the wireless access interface provided by the one or more network elements of the mobile communications network, and a controller configured to control the receiver unit to receive one or more signalling messages from the mobile communications network, and the transmitter unit to transmit one or more signalling messages to the communications network, to establish a communications context for communicating data packets using a packet communications bearer from the communications device via the mobile communications network when operating in a connected state, and to release the communications context and the packet communications bearer to an idle state, wherein the controller is configured in combination with the receiver to receive signalling information providing an indication of one or more functions performed by at least one of the receiver, the transmitter or the controller which can be changed in a power saving state to reduce power consumed by the communications device, and when in either the idle state or the connected state, to enter the power saving state in which the one or more of the operations performed by at least one of the receiver, the transmitter or the controller are configured in accordance with the indication of the changed functions received in the signalling information from the mobile communications network.

2. A communications device according to clause 1, wherein the power saving state is one of a plurality of power saving states and the controller is configured to receive the signalling information from the mobile communications network, which provides an indication of one of the plurality of power saving states to use, each of the power saving states providing a different set of one or more operations performed by at least one of the receiver, the transmitter or the controller which can be changed to reduce the power consumed by the communications device, and the controller is configured to enter one of the power saving states in accordance with predetermined conditions, in which the one or more of the operations performed by at least one of the receiver, the transmitter or the controller are configured in accordance with the indication of the changed functions for the one of the power saving states indicated by the signalling information.

3. A communications device according to clause 1 or 2, wherein the signalling information received from the mobile communications network provides an indication of the conditions for changing from one of the connected state or the idle state to the power saving state.

4. A communications device according to clause 1, 2 or 3, wherein the predetermined conditions include whether or not the communications device can enter the power saving state from the idle state or the connected state.

5. A communications device according to any of clauses 1 to 4, wherein the predetermined conditions include entering the power saving state in response to a signalling message received from the communications network and the controller is configured in combination with the transmitter and the receiver to enter the power saving state in response to the signalling message received from the mobile communications network.

6. A communications device according to any of clauses 1 to 5, wherein the predetermined conditions include entering the power saving state when a parameter is compared with a predetermined value, and the controller is configured in combination with the transmitter and the receiver to enter the power saving state in response to a comparison between the value and the parameter measured by the controller.

7. A communications device according to clause 6, comprising a clock and the parameter measured by the controller is a predetermined passage of time since data has been transmitted via the packet communications bearer.

8. A communications device according to any of clauses 1 to 7, wherein the controller is configured in combination of the transmitter and the receiver, when in the idle state to receive paging messages, when transmitted, from the mobile communications network, to control the receiver to perform measurements for maintaining access to the wireless access interface for transmitting and receiving the signals via the mobile communications network when in a connected state, wherein in the power saving state the changed operations performed by the at least one of the transmitter, the receiver or the controller include at least one of reducing a number of occasions when the receiver is powered to receive the paging messages, reducing the measurements performed by the receiver.

9. A communications device according to any of clauses 1 to 8, wherein the controller is configured in combination with the receiver to receive signals transmitted via the wireless access interface in accordance with a discontinuous reception cycle in which the receiver is powered down and cannot receive the signals for a predetermined period, and the changed operations performed by the receiver in the power saving state includes increasing the temporal length of the discontinuous transmission cycle.

10. A communications device according to any of clauses 1 to 9, wherein the controller is configured in combination with the transmitter and the receiver to change the operations of the controller, the receiver and the transmitter to transition to the idle state or the connected state in accordance with at least one of a requirement to perform a tracking area up-date, a requirement to transmit data to the wireless communications network, receiving a paging message from the wireless communications network, after a predetermined time in the power saving state, after measurements taken during power saving state meet a measurement criteria, or after time determined from measurements performed before entering the power saving state.

11. A communications device according to clause 10, wherein the controller is configured in combination with the transmitter and the receiver to change the operations of the controller, the receiver and the transmitter to transition to the idle state or the connected state from the power saving state in accordance with measurements performed in the power saving state.

12. A communications device according to clause 11, wherein the measurements performed by controller include a measurement of a received signal strength of signals received from one or more infrastructure equipment, and depending on the received signal strength, moving to the Idle state for re-establishing the connection or moving back to the connected state with an existing connection.

13. A method of communicating data packets from an infrastructure equipment via a mobile communications network, the method comprising:

transmitting signals to the mobile communications network via the wireless access interface provided by one or more network elements of the mobile communications network, and receiving signals from the mobile communications network via the wireless access interface provided by the one or more network elements of the mobile communications network, wherein the receiving includes receiving one or more signalling messages from the mobile communications network, and the transmitting includes transmitting one or more signalling messages to the communications network, to establish a communications context for communicating data packets using a packet communications bearer to or from the communications device via the mobile communications network when operating in a connected state, and to release the communications context and the packet communications bearer, to an idle state, and the method includes receiving signalling information providing an indication of one or more functions performed by at least one of the receiver, the transmitter or the controller which can be changed in a power saving state to reduce power consumed by the communications device, and when in either the idle state or the connected state, entering the power saving state in which the one or more of the operations performed by at least one of the receiver, the transmitter or the controller are configured in accordance with the indication of the changed functions received in the signalling information from the mobile communications network.

14. A method according to clause 13, wherein the power saving state is one of a plurality of power saving states and the receiving includes receiving the signalling information from the mobile communications network, which provides an indication of one of the plurality of power saving states to use, each of the power saving states providing a different set of one or more operations performed by the communications device which can be changed to reduce the power consumed by the communications device and the entering the power saving state includes entering one of the power saving states in accordance with predetermined conditions, in which the one or more of the operations performed by the communications device are configured in accordance with the indication of the changed functions for the one of the power saving state indicated by the signalling information.

15. A method according to clause 13 or 14, wherein the signalling information received from the mobile communications network provides an indication of the conditions for changing from one of the connected state or the idle state to the power saving state.

16. A method according to clause 13, 14 or 15, wherein the predetermined conditions include whether or not the communications device can enter the power saving state from the idle state or the connected state.

17. A method according to any of clauses 13 to 16, wherein the predetermined conditions include entering a power saving state in response to a signalling message received from the communications network, and the method includes receiving a signalling message instructing the communications device to enter the power saving state, and the entering of the power saving state includes entering the reduced power saving state in response to the signalling message received from the mobile communications network.

18. A method according to any of clauses 13 to 17, wherein the predetermined conditions include entering a power saving state when a parameter is compared with a predetermined value, and the entering the power saving state includes measuring the parameter and entering the power saving state in response to a comparison between the value and the measured parameter.

19. A method according to any of clauses 13 to 18, comprising changing the operations of the controller, the receiver and the transmitter to transition to the idle state or the connected state in accordance with at least one of a requirement to perform a tracking area up-date, a requirement to transmit data to the wireless communications network, receiving a paging message from the wireless communications network, after a predetermined time in the power saving state, after measurements taken during power saving state meet a measurement criteria, or after time determined from measurements performed before entering the power saving state.

20. A method according to clause 19, wherein the changing the operations of the controller, the receiver and the transmitter to transition to the idle state or the connected state, includes changing the operations of the controller, the receiver and the transmitter to transition to the idle state or the connected state from the power saving state in accordance with measurements performed in the power saving state.

21. A method according to clause 20, wherein the measurements performed in the power saving state include measuring a received signal strength of signals received from one or more infrastructure equipment, and depending on the received signal strength, moving to the idle state for re-establishing the connection or moving back to the connected state with an existing connection.

22. An infrastructure equipment for forming part of a wireless communications network for transmitting data to and receiving data from a communications device, the infrastructure equipment comprising:

a transmitter unit configured to transmit signals to the communications device in accordance with a wireless access interface, and a receiver unit configured to receive signals from the communications device via the wireless access interface, and a controller configured to control the receiver unit to receive one or more signalling messages from the communications device, and the transmitter unit to transmit one or more signalling messages to the communications device, to establish a communications context for communicating data packets using a packet communications bearer from the communications device via the wireless communications network when the communications device is operating in a connected state, and to release the communications context and the packet communications bearer, when the communications device changes in an idle state, wherein the controller is configured in combination with the transmitter to transmit signalling information providing an indication of one or more functions performed by the communications device which can be changed in a power saving state to reduce power consumed by the communications device, to the effect that, when the communications device is in either the idle state or the connected state, the communications device can enter the power saving state in which the one or more of the operations performed by the communications device are configured in accordance with the indication of the changed functions indicated by the signalling information transmitted to the communications device.

23. An infrastructure equipment according to clause 22, wherein the power saving state is one of a plurality of power saving states and the controller is configured in combination with the transmitter to transmit the signalling information to the communications device, which provides an indication of one of the plurality of power saving states, each of the power saving states providing a different set of one or more operations performed by communications device which can be changed, so that the communications device can enter one of the power saving states in accordance with predetermined conditions, in which the one or more of the operations performed by communications device can be configured in accordance with the indication of the changed functions for that power saving state.

24. An infrastructure equipment according to clause 22 or 23, wherein the signalling information transmitted to the communications device provides an indication of the conditions for the communications device to change from one of the connected state or the idle state to the power saving state.

25. An infrastructure equipment according to clause 22, 23 or 24, wherein the predetermined conditions include whether or not the communications device can enter the power saving state from the idle state or the connected state.

26. An infrastructure equipment according to any of clauses 22 to 25, wherein the predetermined conditions include transmitting a signalling message to the communications device to instruct the communications device to enter the power saving state.

27. A method of communicating data packets to an infrastructure equipment from a communications device, the method comprising:

transmitting signals to the mobile communications network via the wireless access interface provided by one or more network elements of the mobile communications network, and receiving signals from the mobile communications network via the wireless access interface, wherein the receiving includes receiving one or more signalling messages from the mobile communications network, and the transmitting includes transmitting one or more signalling messages to the communications network, to establish a communications context for communicating data packets using a packet communications bearer to or from the communications device via the mobile communications network when operating in a connected state, and to release the communications context and the packet communications bearer, to an idle state, and the method includes transmitting signalling information providing an indication of one or more functions performed by the communications device which can be changed in a power saving state to reduce power consumed by the communications device, to the effect that, when the communications device is in either the idle state or the connected state, the communications device can enter the power saving state in which the one or more of the operations performed by the communications device are configured in accordance with the indication of the changed functions indicated by the signalling information transmitted to the communications device.

The invention claimed is:

1. A communications device for transmitting data to and receiving data from a mobile communications network, the mobile communications network including one or more network elements providing a wireless access interface for communicating with the communications device, the communications device comprising:

a transmitter configured to transmit signals to the mobile communications network via the wireless access interface provided by the one or more network elements of the mobile communications network;

a receiver configured to receive signals from the mobile communications network via the wireless access interface provided by the one or more network elements of the mobile communications network; and a controller configured to:

control the receiver to receive one or more signaling messages from the mobile communications network, and the transmitter to transmit one or more signaling messages to the communications network, establish a communications context for communicating data packets using a packet communications bearer from the communications device via the mobile communications network when operating in a connected state, and release the communications context and the packet communications bearer to an idle state, wherein the controller is configured in combination with the receiver to:

receive signaling information providing an indication of one or more functions performed by at least one of the receiver, the transmitter or the controller which can be changed in a power saving state to reduce power consumed by the communications device, the signaling information being received in response to a power saving request message sent by the controller via the transmitter, and when in either the idle state or the connected state, enter the power saving state in which the one or more of the operations performed by at least one of the receiver, the transmitter or the controller are configured in accordance with the indication of the changed functions received in the signaling information from the mobile communications network.

2. The communications device as claimed in claim 1, wherein the power saving state is one of a plurality of power saving states and the controller is configured:

to receive the signaling information from the mobile communications network, which provides an indication of one of the plurality of power saving states to use, each of the power saving states providing a different set of one or more operations performed by at least one of the receiver, the transmitter or the controller which can be changed to reduce the power consumed by the communications device, and the controller is configured to enter one of the power saving states in accordance with predetermined conditions, in which the one or more of the operations performed by at least one of the receiver, the transmitter or the controller are configured in accordance with the indication of the changed functions for the one of the power saving states indicated by the signaling information.

3. The communications device as claimed in claim 1, wherein the signaling information received from the mobile communications network provides an indication of the conditions for changing from one of the connected state or the idle state to the power saving state.

4. The communications device as claimed in claim 1, wherein the predetermined conditions include whether or not the communications device can enter the power saving state from the idle state or the connected state.

5. The communications device as claimed in claim 1, wherein the predetermined conditions include entering the power saving state in response to a signaling message received from the communications network and the controller is configured in combination with the transmitter and the receiver to enter the power saving state in response to the signaling message received from the mobile communications network.

6. The communications device as claimed in claim 1, wherein the predetermined conditions include entering the power saving state when a parameter is compared with a predetermined value, and the controller is configured in combination with the transmitter and the receiver to enter the power saving state in response to a comparison between the value and the parameter measured by the controller.

7. The communications device as claimed in claim 6, comprising a clock and the parameter measured by the controller is a predetermined passage of time since data has been transmitted via the packet communications bearer.

8. The communications device as claimed in claim 1, wherein the controller is configured in combination of the transmitter and the receiver, when in the idle state:

to receive paging messages, when transmitted, from the mobile communications network, to control the receiver to perform measurements for maintaining access to the wireless access interface for transmitting and receiving the signals via the mobile communications network when in a connected state, wherein in the power saving state the changed operations performed by the at least one of the transmitter, the receiver or the controller include at least one of reducing a number of occasions when the receiver is powered to receive the paging messages, reducing the measurements performed by the receiver.

9. The communications device as claimed in claim 1, wherein the controller is configured in combination with the receiver to receive signals transmitted via the wireless access interface in accordance with a discontinuous reception cycle in which the receiver is powered down and cannot receive the signals for a predetermined period, and the changed operations performed by the receiver in the power saving state includes increasing the temporal length of the discontinuous transmission cycle.

10. The communications device as claimed in claim 1, wherein the controller is configured in combination with the transmitter and the receiver:

to change the operations of the controller, the receiver and the transmitter to transition to the idle state or the connected state in accordance with at least one of a requirement to perform a tracking area up-date, a requirement to transmit data to the wireless communications network, receiving a paging message from the wireless communications network, after a predetermined time in the power saving state, after measurements taken during power saving state meet a measurement criteria, or after time determined from measurements performed before entering the power saving state.

11. The communications device as claimed in claim 10, wherein the controller is configured in combination with the transmitter and the receiver to change the operations of the controller, the receiver and the transmitter to transition to the idle state or the connected state from the power saving state in accordance with measurements performed in the power saving state.

12. The communications device as claimed in claim 11, wherein the measurements performed by controller include a measurement of a received signal strength of signals received from one or more infrastructure equipment, and depending on the received signal strength, moving to the Idle state for re-establishing the connection or moving back to the connected state with an existing connection.

13. A method of communicating data packets from an infrastructure equipment via a mobile communications network, the method comprising:

transmitting signals to the mobile communications network via the wireless access interface provided by one or more network elements of the mobile communications network, and receiving signals from the mobile communications network via the wireless access interface provided by the one or more network elements of the mobile communications network, wherein the receiving includes receiving one or more signaling messages from the mobile communications network, and the transmitting includes transmitting one or more signaling messages to the communications network, to establish a communications context for communicating data packets using a packet communications bearer to or from the communications device via the mobile communications network when operating in a connected state, and to release the communications context and the packet communications bearer, to an idle state, and the method further includes:
receiving singaling information providing an indication of one or more functions performed by at least one of the receiver, the transmitter or the controller which can be changed in a power saving state to reduce power consumed by the communications device, the signaling information being received in response to transmission of a power saving request message, and when in either the idle state or the connected state, entering the power saving state in which the one or more of the operations performed by at least one of the receiver, the transmitter or the controller are configured in accordance with the indication of the changed functions received in the signaling information from the mobile communications network.

14. The method as claimed in claim 13, wherein the power saving state is one of a plurality of power saving states and the receiving includes:
receiving the signaling information from the mobile communications network, which provides an indication of one of the plurality of power saving states to use, each of the power saving states providing a different set of one or more operations performed by the communications device which can be changed to reduce the power consumed by the communications device and the entering the power saving state includes:
entering one of the power saving states in accordance with predetermined conditions, in which the one or more of the operations performed by the communications device are configured in accordance with the indication of the changed functions for the one of the power saving state indicated by the signaling information.

15. The method as claimed in claim 13, wherein the signaling information received from the mobile communications network provides an indication of the conditions for changing from one of the connected state or the idle state to the power saving state.

16. The method as claimed in claim 13, wherein the predetermined conditions include whether or not the communications device can enter the power saving state from the idle state or the connected state.

17. The method as claimed in claim 13, wherein the predetermined conditions include entering a power saving state in response to a signaling message received from the communications network, and the method includes receiving a signaling message instructing the communications device to enter the power saving state, and the entering of the power saving state includes
entering the reduced power saving state in response to the signaling message received from the mobile communications network.

18. The method as claimed in claim 13, wherein the predetermined conditions include entering a power saving state when a parameter is compared with a predetermined value, and the entering the power saving state includes measuring the parameter and entering the power saving state in response to a comparison between the value and the measured parameter.

19. The method as claimed in claim 13, comprising:
changing the operations of the controller, the receiver and the transmitter to transition to the idle state or the connected state in accordance with at least one of
a requirement to perform a tracking area up-date,
a requirement to transmit data to the wireless communications network,
receiving a paging message from the wireless communications network, after a predetermined time in the power saving state,
after measurements taken during power saving state meet a measurement criteria, or
after time determined from measurements performed before entering the power saving state.

20. The method as claimed in claim 19, wherein the changing the operations of the controller, the receiver and the transmitter to transition to the idle state or the connected state, includes changing the operations of the controller, the receiver and the transmitter to transition to the idle state or the connected state from the power saving state in accordance with measurements performed in the power saving state.

21. The method as claimed in claim 20, wherein the measurements performed in the power saving state include measuring a received signal strength of signals received from one or more infrastructure equipment, and depending on the received signal strength, moving to the idle state for re-establishing the connection or moving back to the connected state with an existing connection.

22. An infrastructure equipment for forming part of a wireless communications network for transmitting data to and receiving data from a communications device, the infrastructure equipment comprising:
a transmitter configured to transmit signals to the communications device in accordance with a wireless access interface;
a receiver configured to receive signals from the communications deice via the wireless access interface, and
a controller configured to:
control the receiver to receive one or more signaling messages from the communications device, and the transmitter to transmit one or more signaling messages to the communications device,
establish a communications context for communicating data packets using a packet communications bearer from the communications device via the wireless communications network when the communications device is operating in a connected state, and
release the communications context and the packet communications bearer, when the communications device changes in an idle state,
wherein the controller is configured in combination with the transmitter to:

transmit signaling information providing an indication of one or more functions performed by the communications device which can be changed in a power saving state to reduce power consumed by the communications device, to the effect that, when the communications device is in either the idle state or the connected state, the communications device can enter the power saving state in which the one or more of the operations performed by the communications device are configured in accordance with the indication of the changed functions indicated by the signaling information transmitted to the communications device, the signaling information being transmitted in response to reception of a power saving request message received from the communications device.

23. A method of communicating data packets to an infrastructure equipment from a communications device, the method comprising:
   transmitting signals to the mobile communications network via the wireless access interface provided by one or more network elements of the mobile communications network, and
   receiving signals from the mobile communications network via the wireless access interface, wherein the receiving includes receiving one or more signaling messages from the mobile communications network, and the transmitting includes transmitting one or more signaling messages to the communications network,
   to establish a communications context for communicating data packets using a packet communications bearer to or from the communications device via the mobile communications network when operating in a connected state, and
   to release the communications context and the packet communications bearer, to an idle state, and
   the method further includes:
      transmitting signaling information providing an indication of one or more functions performed by the communications device which can be changed in a power saving state to reduce power consumed by the communications device, to the effect that, when the communications device is in either the idle state or the connected state, the communications device can enter the power saving state in which the one or more of the operations performed by the communications device are configured in accordance with the indication of the changed functions indicated by the signaling information transmitted to the communications device, the signaling information being transmitted in response to reception of a power saving request message received from the communications device.

* * * * *